United States Patent
Jung et al.

(10) Patent No.: US 9,807,375 B2
(45) Date of Patent: Oct. 31, 2017

(54) THREE DIMENSIONAL IMAGE DISPLAY DEVICE

(71) Applicant: SAMSUNG DISPLAY CO., LTD., Yongin, Gyeonggi-do (KR)

(72) Inventors: Kyung Ho Jung, Seongnam-si (KR); Goro Hamagishi, Hwaseong-si (KR)

(73) Assignee: SAMSUNG DISPLAY CO, LTD., Yongin, Gyeonggi-Do (KR)

( * ) Notice: Subject to any disclaimer, the term of this patent is extended or adjusted under 35 U.S.C. 154(b) by 261 days.

(21) Appl. No.: 14/828,273

(22) Filed: Aug. 17, 2015

(65) Prior Publication Data

US 2016/0150220 A1    May 26, 2016

(30) Foreign Application Priority Data

Nov. 24, 2014 (KR) .......................... 10-2014-0164609

(51) Int. Cl.
  *G02F 1/1335* (2006.01)
  *H04N 13/04* (2006.01)
  *G02B 27/22* (2006.01)

(52) U.S. Cl.
  CPC ....... *H04N 13/0404* (2013.01); *G02B 27/225* (2013.01); *G02B 27/2214* (2013.01); *H04N 13/0415* (2013.01); *H04N 13/0447* (2013.01)

(58) Field of Classification Search
  None
  See application file for complete search history.

(56) References Cited

U.S. PATENT DOCUMENTS

2011/0001803 A1*  1/2011  De Zwart .......... H04N 13/0415
                                                              348/51

FOREIGN PATENT DOCUMENTS

| JP | 10-186294 | 7/1998 |
|---|---|---|
| JP | 2001-166259 | 6/2001 |
| JP | 2009-098311 | 5/2009 |
| JP | 2011-164148 | 8/2011 |
| JP | 2011-197376 | 10/2011 |
| JP | 2011-197508 | 10/2011 |
| JP | 2013-217951 | 10/2013 |
| KR | 1020090006472 | 1/2009 |
| KR | 1020140020927 | 2/2014 |

* cited by examiner

*Primary Examiner* — Richard Kim
(74) *Attorney, Agent, or Firm* — F. Chau & Associates, LLC

(57) ABSTRACT

A 3D image display device includes: a display panel that includes a plurality of pixels arranged in a matrix form; and a view point division part that divides the plurality of pixels into a plurality of corresponding view points. The view point division part includes a plurality of view point division units each associated with a lenticular lens tilted at an inclination angle and an inclination angle changing unit for changing the inclination angles of the plurality of the view point division units to correspond to a portrait mode or a landscape mode. The view point division part and the display panel are configured so that a same optimal viewing distance is calculated in portrait mode and landscape mode.

20 Claims, 26 Drawing Sheets

FIG. 15A

| m | b | PD | 2n | Lp | Control unit of HT 63/n | Defocus of lens |
|---|---|---|---|---|---|---|
| 2 | 5 | 6 | 12 | 6Hp | 10.5mm | Hp/2 |
| 3 | 7 | 9 | 18 | 6Hp | 7mm | Hp/3 |
| 4 | 9 | 12 | 24 | 6Hp | 5.25mm | Hp/4 |
| 5 | 11 | 15 | 30 | 6Hp | 4.2mm | Hp/5 |
| 6 | 13 | 18 | 36 | 6Hp | 3.5mm | Hp/6 |
| 7 | 15 | 21 | 42 | 6Hp | 3mm | Hp/7 |

THREE DIMENSIONAL IMAGE DISPLAY DEVICE

CROSS-REFERENCE TO RELATED APPLICATION

This application claims priority from Korean Patent Application No. 10-2014-0164609 filed in the Korean Intellectual Property Office on Nov. 24, 2014, and all the benefits accruing therefrom, the contents of which are herein incorporated by reference in their entirety.

BACKGROUND (a) Technical Field

Embodiments of the present disclosure are directed to a three dimensional image display device, and more particularly, to an autostereoscopic three dimensional image display device.

(b) Discussion of the Related Art

With the development of display device technology, three dimensional (3D) image display devices have received attention, and various methods of displaying a 3D image have been studied.

In general, in a 3D image display technology, a 3D effect is achieved by using binocular parallax, which is a most important factor for perceiving objects in 3D at a short distance. That is, when different 2D images are projected to a left eye and a right eye, and an image projected to the left eye, hereafter, referred to as a "left eye image", and an image projected to the right eye, hereafter, referred to as a "right eye image", are transmitted to the brain, the left eye image and the right eye image are combined by the brain and perceived as a 3D image having depth.

A 3D image display device uses binocular disparity, and may be a stereoscopic 3D image display device which requires the use of glasses, such as shutter glasses and polarized glasses, or an autostereoscopic 3D image display device that does not use glasses, but rather an optical system, such as a lenticular lens or a parallax barrier, in the display device.

An autostereoscopic 3D image display device divides a 3D image into many view points using one of a lenticular lens, a parallax barrier having a plurality of openings, etc., and displays the divided 3D image to generate a 3D image.

SUMMARY

Embodiments of the present disclosure can provide a 3D image display device that can maintain an optimal viewing distance while minimizing deterioration of image quality in portrait mode and landscape mode.

An exemplary embodiment of the present disclosure provides a 3D image display device, including a display panel that includes a plurality of pixels arranged in a matrix form; and a view point division part that divides the plurality of pixels into a plurality of corresponding view points. The view point division part includes a plurality of view point division units, each associated with a lenticular lens tilted at an inclination angle and an inclination angle changing unit for changing the inclination angles of the plurality of the view point division units to correspond to a portrait mode or a landscape mode. The view point division part and the display panel are configured so that a same optimal viewing distance (OVD) is calculated in portrait mode and landscape mode.

The inclination angle changing unit may include an upper substrate; a lower substrate; a plurality of first electrodes disposed on the upper substrate to correspond to the inclination angle of one mode of portrait mode or landscape mode; a plurality of second electrodes disposed on the lower substrate to correspond to the inclination angle of a mode other than the one mode; and a liquid crystal layer interposed between the upper substrate and the lower substrate. The liquid crystal layer changes into the lenticular lenses according to a voltage applied to at least one of the plurality of first electrodes and second electrodes.

The inclination angle in portrait mode may be defined according to a value obtained by multiplying a first coefficient by a first ratio between a horizontal pitch of a pixel and a vertical pitch of the pixel, the inclination angle in landscape mode may be defined according to a value obtained by multiplying a second coefficient by a reciprocal of the first ratio, and a second ratio between a horizontal lens pitch of the lenticular lens and a vertical lens pitch of the lenticular lens may be the first ratio multiplied by a ratio between a function of two variables used to determine the first coefficient and a function of two variables used to determine the second coefficient.

Hp is the horizontal pitch of the pixel, Vp is the vertical pitch of the pixel, Hp<Vp, b, m, n, and a are natural numbers, A1 is the inclination angle in portrait mode and A2 is the inclination angle in landscape mode, A1 and A2 may be defined by the following Equations, $$A1 = \tan^{-1}\frac{b*Hp}{m*Vp},\ A2 = \tan^{-1}\frac{n*Vp}{a*Hp};$$

Lp is a horizontal lens pitch of the lenticular lens and L1 is a vertical lens pitch of the lenticular lens, Lp and L1 may satisfy the second ratio of the following Equation, $$Lp:L1 = \frac{2*(b+m-1)*Hp}{m} : \frac{2*(a+n-1)*Vp}{a}$$

where, values of b, m, n, and a may be determined to satisfy Lp=L1 and the inclination angles of the plurality of view point division units in portrait mode and landscape mode are determined.

E is an average human binocular distance, d is the OVD, and g is a distance between the view point division part and the display panel, the g value may be determined to satisfy the following Equations, $$Hp: g = m*\frac{E}{(b+m-1)} : d,$$

$$d: Lp = (d+g):2*(b+m-1)*\frac{Hp}{m},$$

$$Vp: g = a*\frac{E}{(n+a-1)} : d,$$

$$d: L1 = (d+g):2*(a+n-1)*\frac{Vp}{a},$$

b, m, n, and a may satisfy the following Equation $$a+n=b+m.$$

$$\frac{Hp}{m} = \frac{Vp}{a}.$$

m and a may satisfy the following Equation

At least one pixel in one of landscape mode or portrait mode may be used as a free pixel. The inclination angle in portrait mode may be defined according to a value obtained by multiplying a first coefficient by a first ratio between a horizontal pitch of a pixel and a vertical pitch of the pixel, the inclination angle in landscape mode may be defined according to a value obtained by multiplying a second coefficient by a reciprocal of the first ratio, and a second ratio between a horizontal lens pitch of the lenticular lens and a vertical lens pitch of the lenticular lens may be the first ratio multiplied by a ratio between a function of two variables used to determine the first coefficient and a function of two variables used to determine the second coefficient and the number of free pixels.

Hp is the horizontal pitch of the pixel, Vp is the vertical pitch of the pixel, Hp<Vp, b, m, n, and a are natural numbers, A1 is the inclination angle in portrait mode and A2 is the inclination angle in landscape mode, A1 and A2 may be defined by the following Equations, $$A1 = \tan^{-1}\frac{b*Hp}{m*Vp}, \quad A2 = \tan^{-1}\frac{n*Vp}{a*Hp}$$

c is the number of free pixels, Lp is the horizontal lens pitch of the lenticular lens, and L1 is the vertical lens pitch of the lenticular lens, Lp and L1 may satisfy the second ratio of the following Equation, $$Lp:L1 = \frac{2*(b+m-1)*Hp}{m} : \frac{2*(a+n-1+c)*Vp}{a}$$

where, values of b, m, n, and a may be determined to satisfy Lp=L1 and the inclination angles of the plurality of view point division units in portrait mode and landscape mode are determined.

E is an average human binocular distance, d is the OVD, and g is a distance between the view point division part and the display panel, the g value may be determined to satisfy the following Equations, $$Hp: g = m*\frac{E}{(b+m-1)} : d,$$

$$d:Lp = (d+g):2*(b+m-1)*\frac{Hp}{m},$$

$$Vp: g = a*\frac{E}{(n+a-1+c)} : d,$$

$$d:L1 = (d+g):2*(a+n-1+c)*\frac{Vp}{a}.$$

b, m, n, and a may satisfy the following Equation
m and a may satisfy the following Equation $$\frac{Hp}{m} = \frac{Vp}{a}.$$

Another exemplary embodiment of the present disclosure provides a 3D image display device that includes a view point division part that divides a plurality of pixels into a plurality of corresponding view points. The view point division part includes a plurality of view point division units having a lenticular lens shape tilted according to an inclination angle; and an inclination angle changing unit for changing the inclination angles of the plurality of the view point division units to correspond to a portrait mode or a landscape mode. The inclination angle in portrait mode is defined according to a value obtained by multiplying a first coefficient by a first ratio between a horizontal pitch of a pixel and a vertical pitch of the pixel, the inclination angle in landscape mode is defined according to a value obtained by multiplying a second coefficient by a reciprocal of the first ratio, and a second ratio between a horizontal lens pitch of the lenticular lens and a vertical lens pitch of the lenticular lens is the first ratio multiplied by a ratio between a function of two variables used to determine the first coefficient and a function of two variables used to determine the second coefficient. An optimal viewing distance is the same in portrait mode and landscape mode.

Another exemplary embodiment of the present disclosure provides a 3D image display device that includes a view point division part that divides a plurality of pixels into a plurality of corresponding view points. The view point division part includes a plurality of view point division units having a lenticular lens shape tilted according to an inclination angle; and an inclination angle changing unit for changing the inclination angles of the plurality of the view point division units to correspond to a portrait mode or a landscape mode, where at least one pixel in one of landscape mode or portrait mode is used as a free pixel. The inclination angle in portrait mode is defined according to a value obtained by multiplying a first coefficient by a first ratio between a horizontal pitch of a pixel and a vertical pitch of the pixel, the inclination angle in landscape mode is defined according to a value obtained by multiplying a second coefficient by a reciprocal of the first ratio, and a second ratio between a horizontal lens pitch of the lenticular lens and a vertical lens pitch of the lenticular lens is the first ratio multiplied by a ratio between a function of two variables used to determine the first coefficient and a function of two variables used to determine the second coefficient and a number of free pixels. An optimal viewing distance is the same in portrait mode and landscape mode.

According to exemplary embodiments of the present disclosure, a 3D image display device can maintain a same optimal viewing distance while minimizing deterioration of image quality in portrait mode and landscape mode.

BRIEF DESCRIPTION OF THE DRAWINGS

FIGS. 15A-B are diagrams that illustrate a combination of values of m and b in portrait mode which may have a same lens pitch as in landscape mode.

DETAILED DESCRIPTION OF EXEMPLARY EMBODIMENTS

Figure 1:
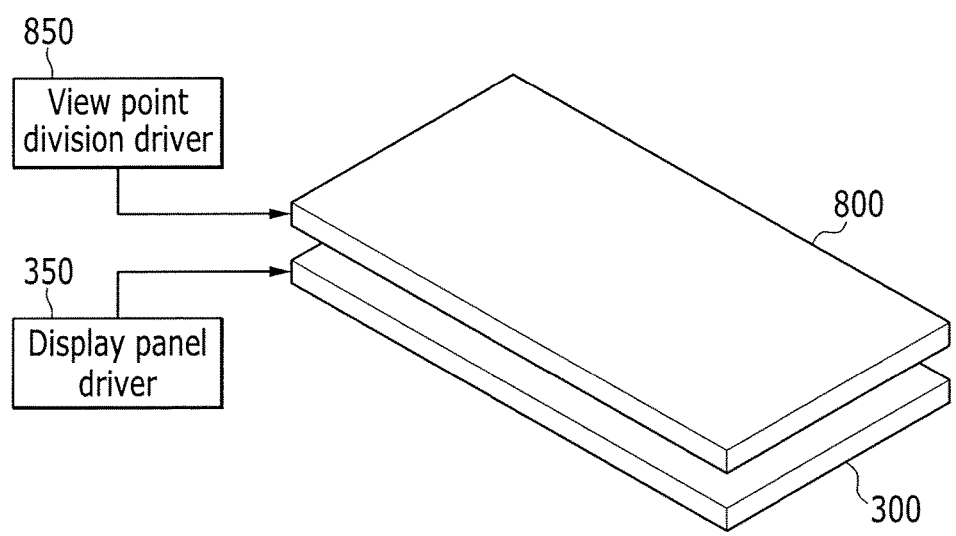
FIG. 1 is a schematic perspective view of a 3D image display device according to an exemplary embodiment of the present disclosure.

Hereinafter, exemplary embodiments of the present disclosure will be described in detail with reference to the accompanying drawings. Further, it should be noted that like reference numerals may refer to like elements as much as possible throughout the drawings.

FIG. 1 is a schematic perspective view of a 3D image display device according to an exemplary embodiment of the present disclosure.

Referring to FIG. 1, a 3D image display device according to an exemplary embodiment of the present disclosure includes a display panel 300, a display panel driver 350, a view point division part 800, and a view point division driver 850.

The display panel 300 displays an image and may be one of various display devices, such as a plasma display panel (PDP), a liquid crystal display, or an organic light emitting display.

Figure 2:
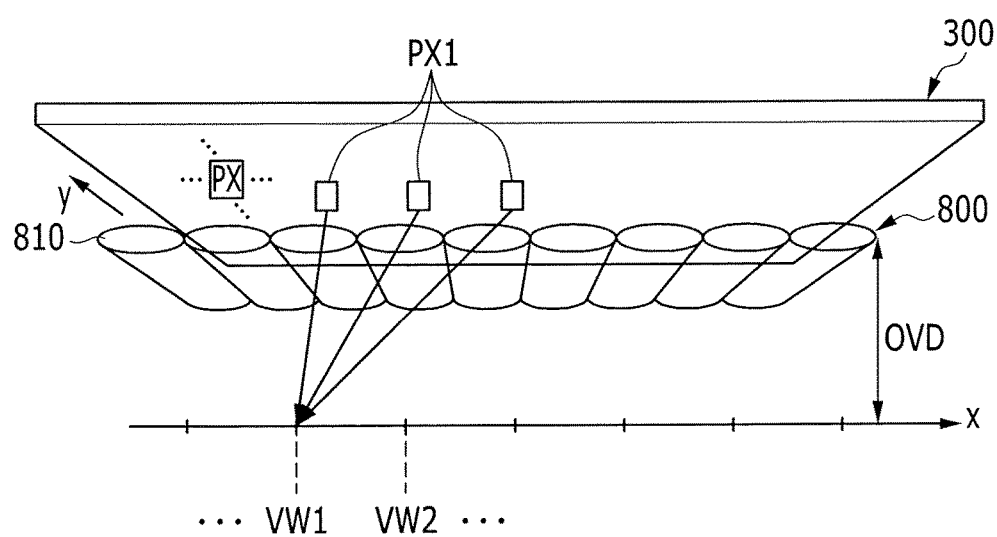
FIG. 2 is a side perspective view of a 3D image display device.

FIG. 2 is a side perspective view of a 3D image display device.

Referring to FIG. 2, the display panel 300 includes a plurality of signal lines and a plurality of pixels PX connected to the signal lines when viewed as an equivalent circuit. The plurality of pixels PX may be arranged substantially in a matrix form. In FIG. 2, a horizontal direction is represented by an x-axis direction and a vertical direction is represented by a y-axis direction. Each pixel PX may include a switching element such as a thin film transistor connected to the signal line and a pixel electrode connected to the switching element. The signal lines may include a plurality of gate lines that transmit gate signals, referred to as "scanning signals", and a plurality of data lines that transmit data voltages.

A pixel PX may uniquely display one primary color in a spatial division mode, or alternately may sequentially display the primary colors over time in a temporal division mode, and as a result, a desired color may be displayed by either the spatial or temporal sum of the primary colors. The primary colors may be various combinations, such as three primary colors or four primary colors, but in an exemplary embodiment, the three primary colors red R, green G, and blue B will be described as an example. A set of pixels PX that display different primary colors may together configure one dot. One dot may be a display unit of a 3D image. The pixels PX in one pixel column may display the same primary color, but are not limited thereto, and pixels PX in a diagonal direction having a predetermined angle with respect to the x axis or the y axis may also display the same primary color.

The display panel driver 350 transmits various driving signals, such as a gate signal and a data signal, to the display panel 300 to drive the display panel 300.

Referring to FIG. 2, the view point division part 800 divides light of an image displayed by each pixel PX of the display panel 300 and transmits the divided light to view points VW1, VW2, . . . , corresponding to each pixel PX.

A distance from the 3D image display device to a point where an optimal 3D image may be viewed is called an optimal viewing distance (OVD). A point on the x axis positioned at the OVD where the image displayed by each pixel PX through the view point division part 800 may be called a view point.

According to an exemplary embodiment of the present disclosure, each pixel PX of the display panel 300 corresponds to one of the view points VW1, VW2, . . . , and a pixel image of each pixel PX may reach the corresponding view points VW1, VW2, . . . , through the view point division part 800.

A viewer views different images at different view points with both eyes and thus may perceive depth, that is, a 3D effect.

FIG. 2 illustrates a finite number of view points VW1, VW2, . . . , positioned at the OVD. For example, letting a view point at which an image displayed by a first pixel PX1 is viewed be a first view point VW1, then the image displayed by each of the plurality of first pixels PX1 may reach the first view point VW1 through the view point division part 800.

FIGS. 1 and 2 show that the view point division part 800 may be positioned between the display panel 300 and the viewer, but embodiments of the present disclosure are not limited thereto.

The view point division driver 850 is connected to the view point division part 800 to generate a driving signal that drives the view point division part 800.

Further, the view point division driver 850 may change the inclination angle of a plurality of view point division units 810 that configure the view point division part 800 based on a magnitude of a voltage applied to a corresponding electrode. This will be described in detail with reference to an exemplary embodiment of FIG. 4.

Figure 3:
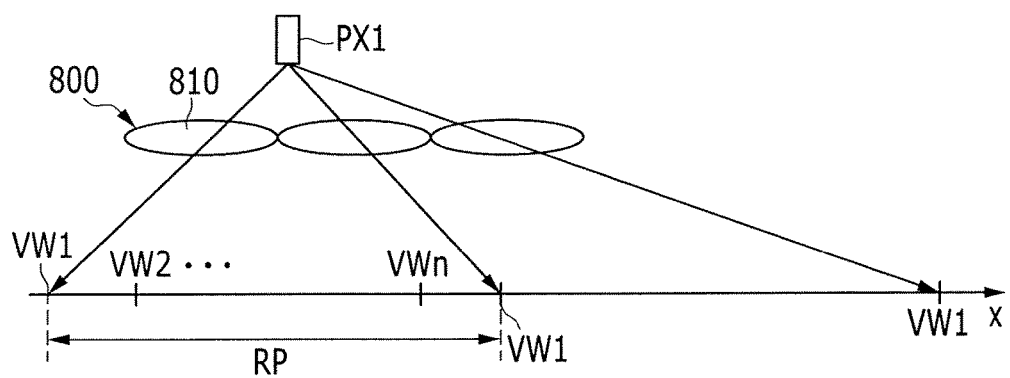
FIG. 3 is illustrates view points of a view point division part when the view point division unit is a lenticular lens.

FIG. 3 illustrates view points of a view point division part when the view point division unit is a lenticular lens.

Referring to FIG. 3, the image displayed on the display panel 300 may reach any one view point VW1-VWn, where n is a natural number, of a unit view area RP, each view point having a predetermined viewing angle, through the view point division part 800. That is, the view points VW1-VWn are present in any one unit view area RP, and a view point corresponding to each of the plurality of pixels PX may be located in a unit view area RP according to a position reached by the light of each pixel.

The unit view areas RP may be periodically repeated on the OVD, and an order of the view points VW1-VWn may be the same in each unit view area RP.

Referring to FIGS. 2 and 3, the view point division part 800 according to an exemplary embodiment of the present disclosure includes a plurality of view point division units 810, and the plurality of view point division units 810 may be a plurality of lenticular lenses arranged in one direction. Each lenticular lens may be elongated in one direction. A row of pixels may correspond to each lenticular lens and adjacent pixels in a row may have different colors from each other. That is, the primary colors displayed by adjacent first pixels PX in each pixel row corresponding to each lenticular lens may differ from each other. To this end, an extending direction of each lenticular lens may be tilted at an acute angle with respect to a y-axis, vertical direction.

Figure 4:
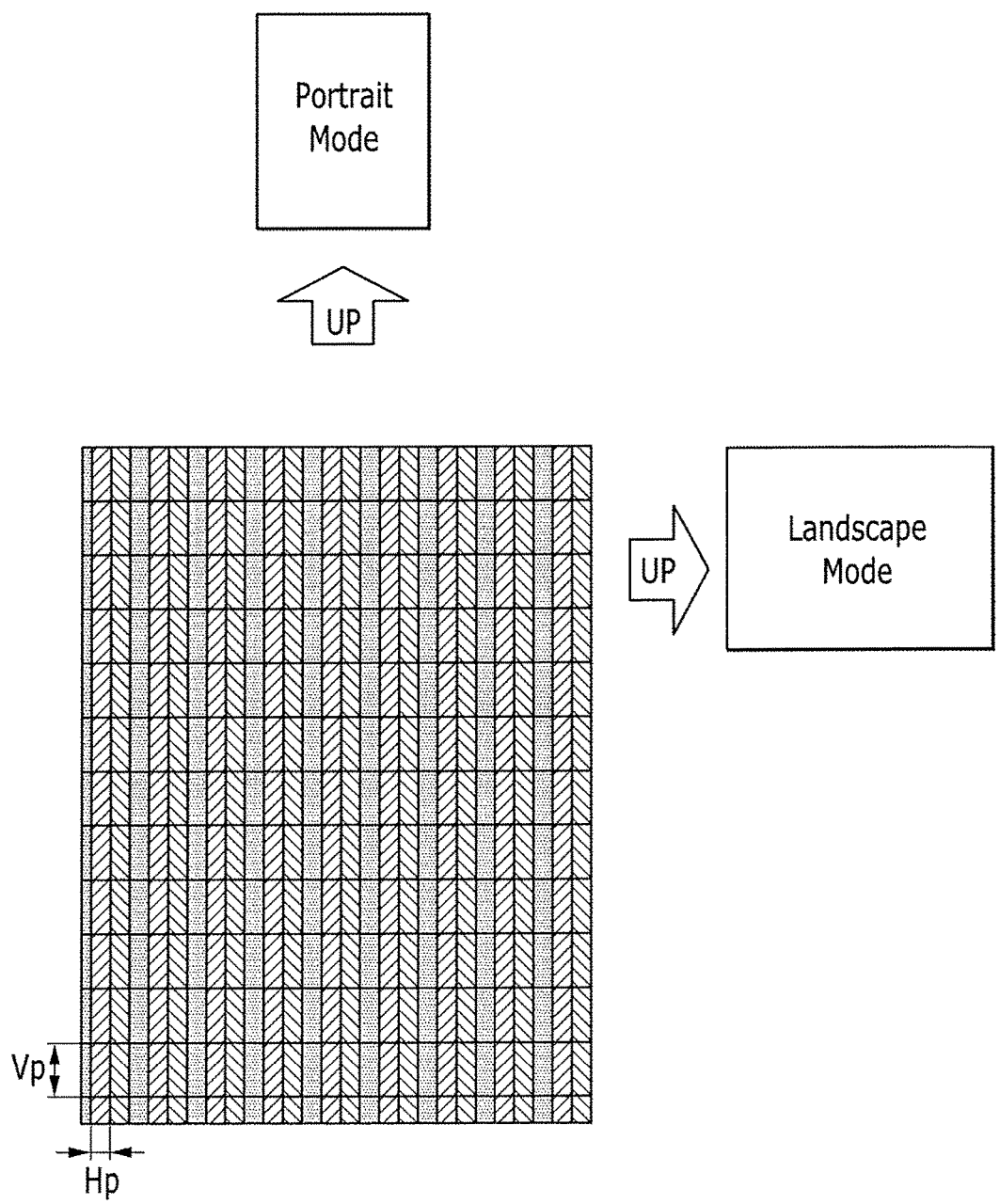
FIG. 4 is a diagram that illustrates portrait mode and landscape mode.

FIG. 4 is a diagram that illustrates portrait mode and landscape mode.

Portrait mode refers to a case in which a horizontal pitch Hp of the pixel PX is less than a vertical pitch Vp.

Landscape mode refers to a case in which the horizontal pitch of the pixel PX is greater than the vertical pitch.

A viewer may rotate a 3D image display device based on a type of image or screen to be viewed to select landscape mode or portrait mode. Data applied to the pixels and a resolution of the display panel 300 may vary based on the display mode selection.

Landscape mode may be referred to as a horizontal mode and portrait mode may be referred to as a vertical mode.

In an embodiment of the present disclosure, the horizontal pitch Hp and the vertical pitch Vp of the pixel PX will be described based on portrait mode. Accordingly, the horizontal pitch Hp of the pixel PX is less than the vertical pitch Vp.

In this case, the horizontal pitch Hp and the vertical pitch Vp may be selected to satisfy a relationship of the following Equation 1.

$$Hp = Vp/3 \quad \text{[Equation 1]}$$

However, according to an exemplary embodiment, the horizontal pitch of the pixel PX may be greater than the vertical pitch based on landscape mode. That is, it may be expressed by Hp=3*Vp.

Figure 5A:
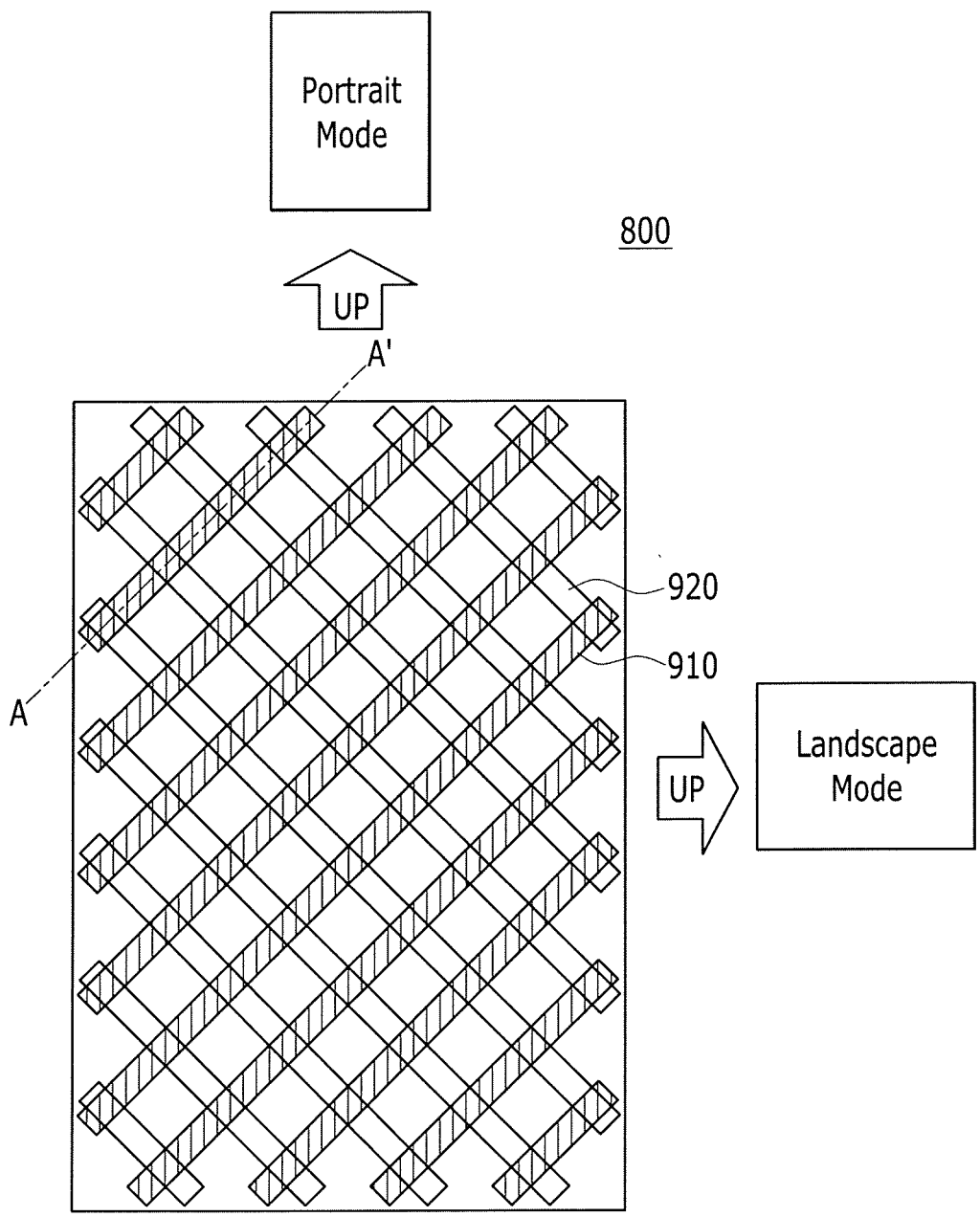
FIGS. 5A-B are diagrams that illustrate a view point division part according to an exemplary embodiment of the present disclosure.
Figure 5B:
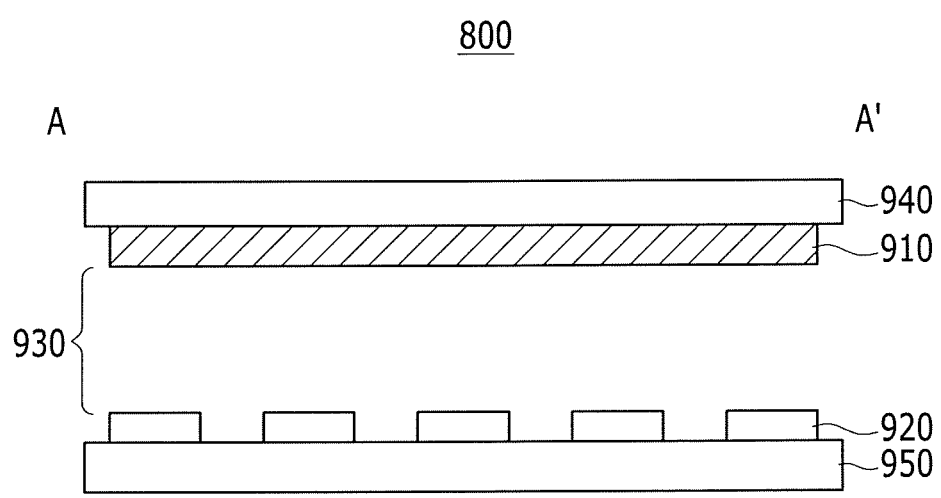

FIGS. 5A-B are diagrams that illustrate a view point division part according to an exemplary embodiment of the present disclosure.

Referring to FIGS. 5A and 5B, the view point division part 800 according to an exemplary embodiment of the present disclosure includes a plurality of first electrodes 910, a plurality of second electrodes 920, a liquid crystal layer 930, an upper substrate 940, and a lower substrate 950.

The plurality of first electrodes 910 may be disposed on the upper substrate 940 to face the lower substrate 950.

The plurality of first electrodes 910 may be extend in parallel in a predetermined direction. Here, the predetermined direction may correspond to the inclination angle in either portrait mode or landscape mode.

The plurality of second electrodes 920 may be disposed on the lower substrate 950 to face the upper substrate 940.

The plurality of second electrodes 920 may extend in parallel in a predetermined direction. Here, the predetermined direction may correspond to the inclination angle of a mode other than the mode to which the first electrode 910 corresponds.

The plurality of first electrodes 910 may extend in a direction corresponding to the inclination angle of landscape mode, and the plurality of second electrodes 920 may extend in a direction corresponding to the inclination angle of portrait mode.

The upper substrate 940, the lower substrate 950, the plurality of first electrodes 910, and the plurality of second electrodes 920 arranged as described above may be referred to as an inclination angle changing unit.

The view point division unit 810 may be configured by the liquid crystal layer 930.

Based on a voltage applied to the electrode of the inclination angle changing unit, a direction of the liquid crystal arrangement of the liquid crystal layer 930 may be changed. The direction of the liquid crystal arrangement is changed to retard incident light passing through each portion of the liquid crystal layer 930, and the retardation is regularly generated, and as a result, the liquid crystal layer 930 may regularly reconfigure the lenticular lens form view point division unit 810.

In portrait mode, the view point division driver 850 applies a driving voltage to the plurality of second electrodes 920 and may apply a predetermined common voltage to the plurality of first electrodes 910.

Alternatively, the plurality of second electrodes 920 may be divided into two alternate groups, and one group may apply the driving voltage and the other group may apply the common voltage.

Alternatively, regardless of the plurality of first electrodes 910, a plate shaped common electrode may also be disposed on the upper substrate 940 or the lower substrate 950.

In landscape mode, the view point division driver 850 applies a driving voltage to the plurality of first electrodes 910 and may apply a predetermined common voltage to the plurality of second electrodes 920.

Alternatively, the plurality of first electrodes 910 may be divided into two alternate groups, and one group may apply the driving voltage and the other group may apply the common voltage.

Alternatively, regardless of the plurality of second electrodes 920, a plate shaped common electrode may also be disposed on the upper substrate 940 or the lower substrate 950.

As such, the inclination angle changing unit may change the inclination angle of the view point division unit 810 by various electrode displacements and driving voltages. Those skilled in the art will be able to configure different view point division parts 800 by applying an LCD technology in the related art.

As another exemplary embodiment, the plurality of first electrodes 910 may be arranged in a direction corresponding to the inclination angle of portrait mode, and the plurality of second electrodes 920 may be arranged in a direction corresponding to the inclination angle of landscape mode.

Figure 6A:
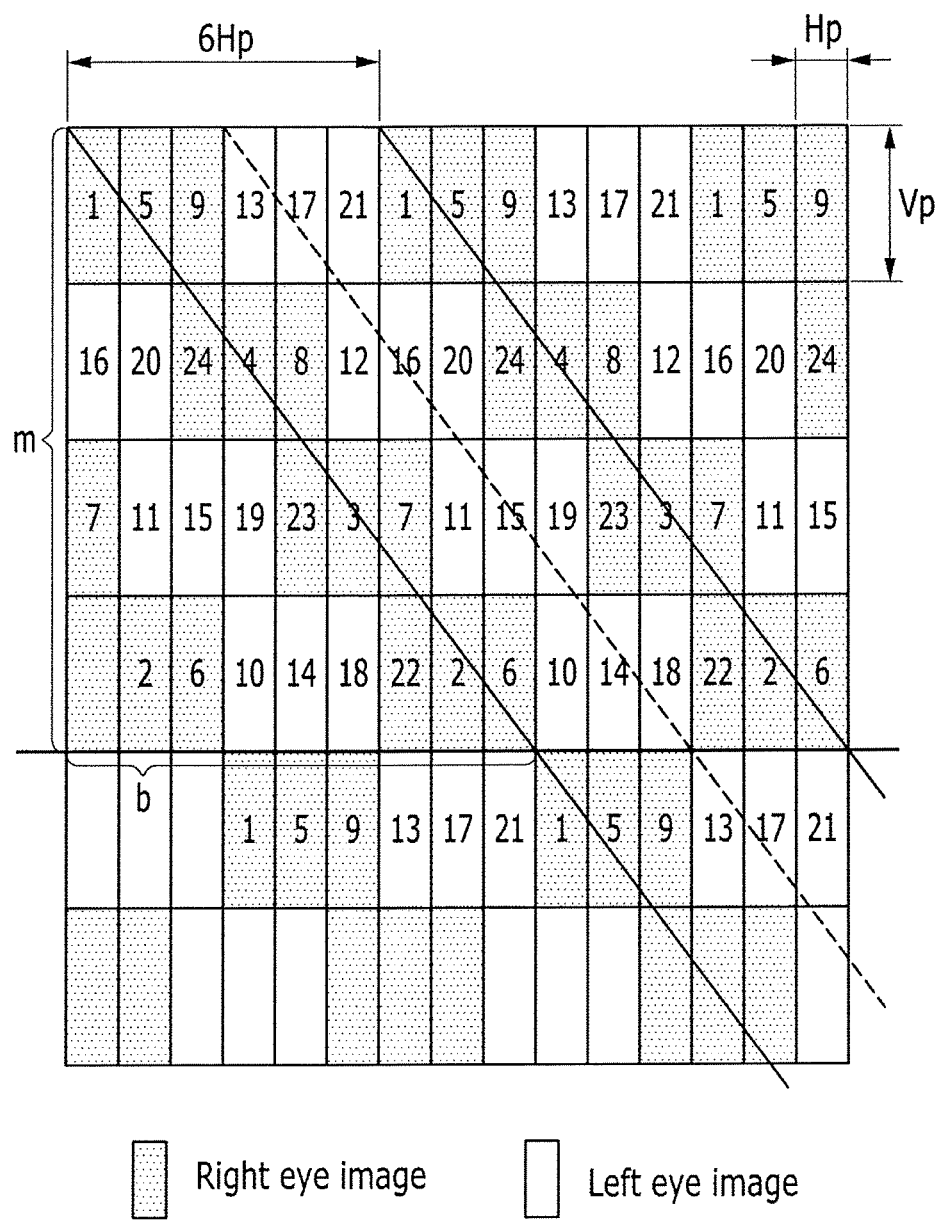
FIGS. 6A-B are diagrams that illustrate a 3D image display device according to an exemplary embodiment of the present disclosure.
Figure 6B:
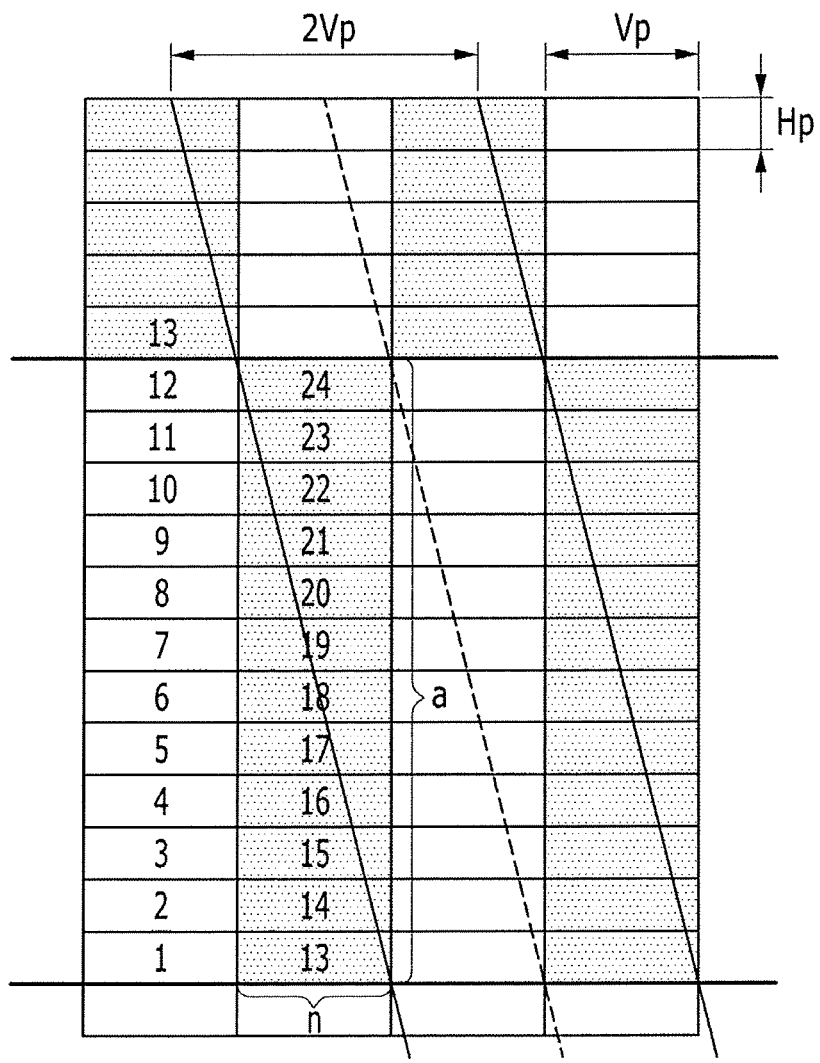

FIGS. 6A-B are diagrams that illustrate a 3D image display device according to an exemplary embodiment of the present disclosure.

FIG. 6A illustrates a correlation of the view point division part 800 and the display panel 300 in portrait mode.

In portrait mode, an inclination angle Al of the lens may be defined by the following Equation 2.

$$A1 = \tan^{-1} \frac{b * Hp}{m * Vp} \quad \text{[Equation 2]}$$

where b refers to the number of horizontal pitches Hp of the pixel when the inclination angle A1 is calculated, and m refers to the number of vertical pitches Vp of the pixel when the inclination angle A1 is calculated.

In this case, b and m are natural numbers.

In an exemplary embodiment of FIG. 6A, b=9 and m=4.

Accordingly, the inclination angle A1 is tan-1((9*Hp)/(4*Vp)).

In FIGS. 6A-B, dotted pixels in which right eye image data are written, and non-dotted pixels are pixels in which left eye image data are written. Hereinafter, unless noted otherwise in the drawings, embodiments of the present disclosure will be described based thereon.

A diagonal solid line passing through right eye pixels indicates a portion of the display panel 300 which is viewed by a user's right eye through the view point division part 800.

A diagonal dotted line passing through left eye pixels indicates a portion of the display panel 300 which is viewed by a user's left eye through the view point division part 800.

A length 6 Hp between both solid lines indicates a period of the view point division unit 810 corresponding to the display panel 300. Hereinafter, the view point division unit 810 will be described based on a lenticular lens. Accordingly, the period of the view point division unit 810 refers to a lens pitch of the lenticular lens.

That is, in an exemplary embodiment of FIG. 6A, the lens pitch has a length corresponding to 6 Hp on the display panel. An actual lens pitch may be defined by determining a distance between the display panel 300 and the view point division part 800, and various factors, such as the configuration of the lens and the configuration of the display panel, may be involved.

Hereinafter, unless noted otherwise, the lens pitch refers to a pitch of the corresponding lens on the display panel 300.

In an exemplary embodiment of FIG. 6A, a lens pitch Lp on the display panel 300 may be defined by the following Equation 3.

$$Lp = \frac{2*(b+m-1)*Hp}{m}$$ [Equation 3]

In Equation 3, a factor (b+m−1) is the number of pixels that configure a proximity dot, to be described below. A value obtained by multiplying the number of pixels configuring the proximity dots by 2 represents a number that reflects proximity dots viewed by both the left eye and the right eye.

A factor Hp/m represents a width of one pixel viewed by the user by defocusing the lens as a unit. The defocusing will be described below.

Accordingly, in a portrait mode of FIG. 6A, the lens pitch Lp is 2*(9+4−1)*Hp/4=6 Hp.

The proximity dots (PD) refers to adjacent pixels that may be simultaneously viewed through the lens.

In a exemplary embodiment of FIG. 6A, pixels 1, 2, 3, 4, 5, 6, 7, 8, 9, 22, 23, and 24 configure proximity dots for one right eye. In this case, the number of pixels configuring the proximity dots is 12.

The number of proximity dots may be selected to be close to b+m−1.

Defocusing refers to accurately misaligning the focus of the lenticular lens on the display panel 300 so that a user views a plane on the display panel 300 instead of a line.

When a line is viewed by a user, the line may alternately pass through a pixel portion and a black matrix portion of the display panel 300, and as a result, a moire phenomenon may occur.

Further, since the viewed portion is small, the brightness visible to the user's eyes may also be low.

To address this situation, a predetermined portion may be defocused by the lenticular lens, and in an embodiment of the present disclosure, an appropriate defocusing amount Da is defined by the following Equation 4 in the case of portrait mode.

$$Da = Hp/m$$ [Equation 4]

The reason for determining an appropriate defocusing amount by Equation 4 will be described with reference to FIG. 7.

According to the aforementioned Equation 4, in FIG. 6A, the appropriate defocusing amount is Hp/4.

FIG. 6B illustrates a correlation of the view point division part 800 and the display panel 300 in landscape mode.

Through the inclination angle changing unit, the liquid crystal layer 930 may form a lenticular lens that has a corresponding inclination angle in landscape mode. In landscape mode, an inclination angle A2 of the lens may be defined by the following Equation 5.

$$A2 = \tan^{-1}\frac{n*Vp}{a*Hp}$$ [Equation 5]

where a refers to the number of horizontal pitches Hp of the pixels when the inclination angle A2 is calculated, and n refers to the number of vertical pitches Vp of the pixels when the inclination angle A2 is calculated.

In this case, a and n are natural numbers.

In an exemplary embodiment of FIG. 6B, a=12 and n=1.

Accordingly, the inclination angle A2 is tan−1(Vp/(12*Hp)).

In landscape mode of FIG. 6B, a length corresponding to a lens pitch L1 is 2 Vp.

The length may be calculated by the following Equation 6.

$$L1 = \frac{2*(a+n-1)*Vp}{a}$$ [Equation 6]

Referring to Equation 1, it can be seen that the lens pitch for FIG. 6B is the same as the lens pitch for FIG. 6A.

In FIG. 6B, since the pixels 13, 14, 15, 16, 17, 18, 19, 20, 21, 22, 23, and 24 configure the proximity dots, the number of pixels configuring the proximity dots is 12. The number of pixels configuring the proximity dots of FIG. 6B may be selected to be close to a+n−1, as is the case of FIG. 6A.

Accordingly, the number of pixels that configure the proximity dots of an exemplary embodiment in FIG. 6B is the same as that of an exemplary embodiment in FIG. 6A.

In the two modes, the same number of pixels configuring the proximity dots may be expressed by the following Equation of a+n−1=b+m−1.

The defocus amount of FIG. 6B may be calculated by Da=Vp/a, similar to the case of FIG. 6A and thus Da=Vp/12.

Referring to Equation 1, it can be seen that the appropriate defocusing amount of an exemplary embodiment in FIG. 6B is the same as that of an exemplary embodiment in FIG. 6A.

In the two modes, the same appropriate defocusing amount Da may be expressed by Hp/m=Vp/a.

As a result, the inclination angle of an exemplary embodiment in FIG. 6B differs from that of an exemplary embodiment in FIG. 6A, but it can be seen that the number of pixels that configure the proximity dots, the lens pitch, and the appropriate defocusing amount are the same as each other.

In portrait mode and landscape mode, the same OVD may be implemented by the same lens pitch.

Further, in portrait mode and landscape mode, since the numbers of pixels that configure the proximity dots are the same, control units for head tracking may be the same, and as a result, thus a same design is possible.

The control unit for head tracking refers to a unit of pixels to be detected to change the pixels where the image is being displayed based on movement of the viewer at the OVD. In this case, the control unit may be a width corresponding to one dot at the OVD.

Figure 11:
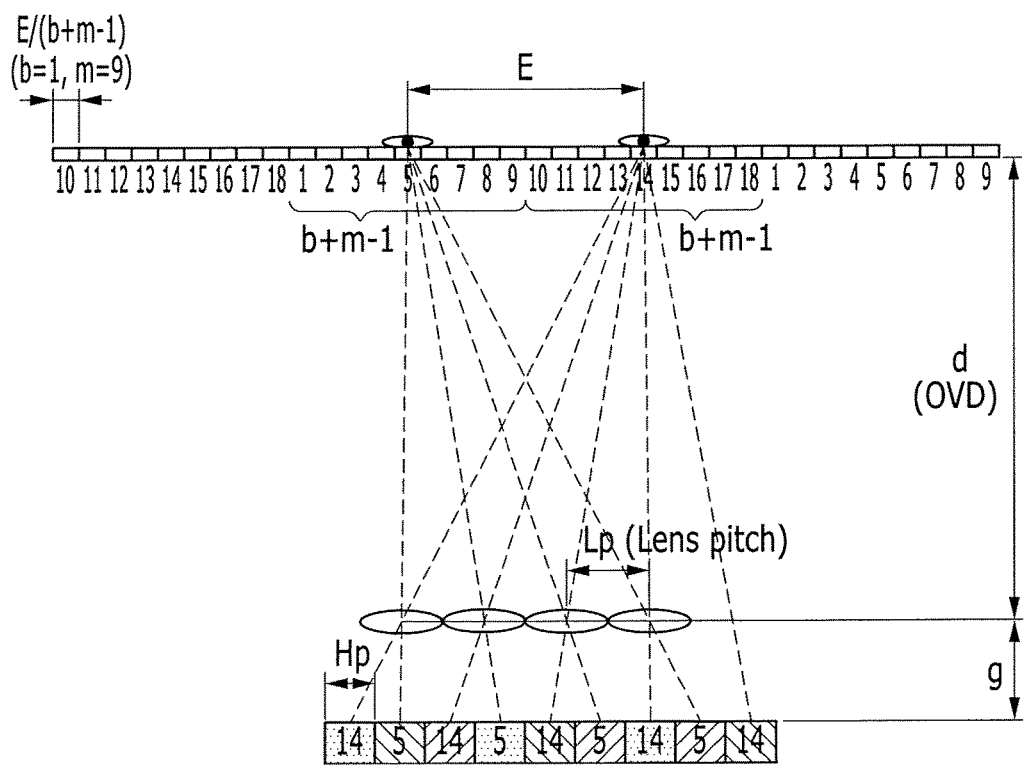
FIG. 11 is a diagram that illustrates an exemplary embodiment of an optimal viewing distance in the embodiment of FIGS. 10A-B.

For example, referring to FIG. 11, letting E be an average human binocular distance, since the pixel width viewed by a user's eyes is E/9, the control unit for head tracking is E/9.

As the control unit increases, the load to change the image displayed in the pixels decreases.

Figure 7:
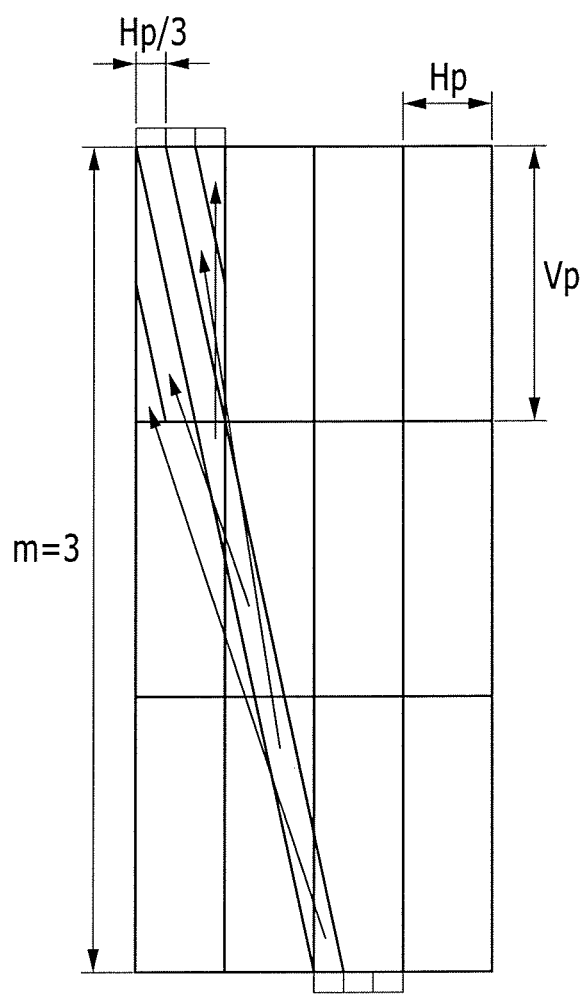
FIG. 7 is a diagram that illustrates defocusing of the view point division unit according to an exemplary embodiment of the present disclosure.

FIG. 7 is a diagram that illustrates defocusing of the view point division unit according to an exemplary embodiment of the present disclosure.

As described with reference to an exemplary embodiment of FIGS. 6A-B, defocusing increases brightness by enlarging the area of the display panel 300 to be viewed by the user.

However, in the case of excessive defocusing, crosstalk may occur and thus defocusing by an appropriate amount is useful.

Crosstalk is a phenomenon in which the left eye image is viewed at the right eye or the right eye image is viewed at the left eye.

In FIG. 7, defocusing in the case of portrait mode will be described.

In an exemplary embodiment of FIG. 7, when m=3 and Hp/3 is determined as the appropriate defocusing amount, one pixel in one proximity dot may be viewed through the lens.

Figure 8A:
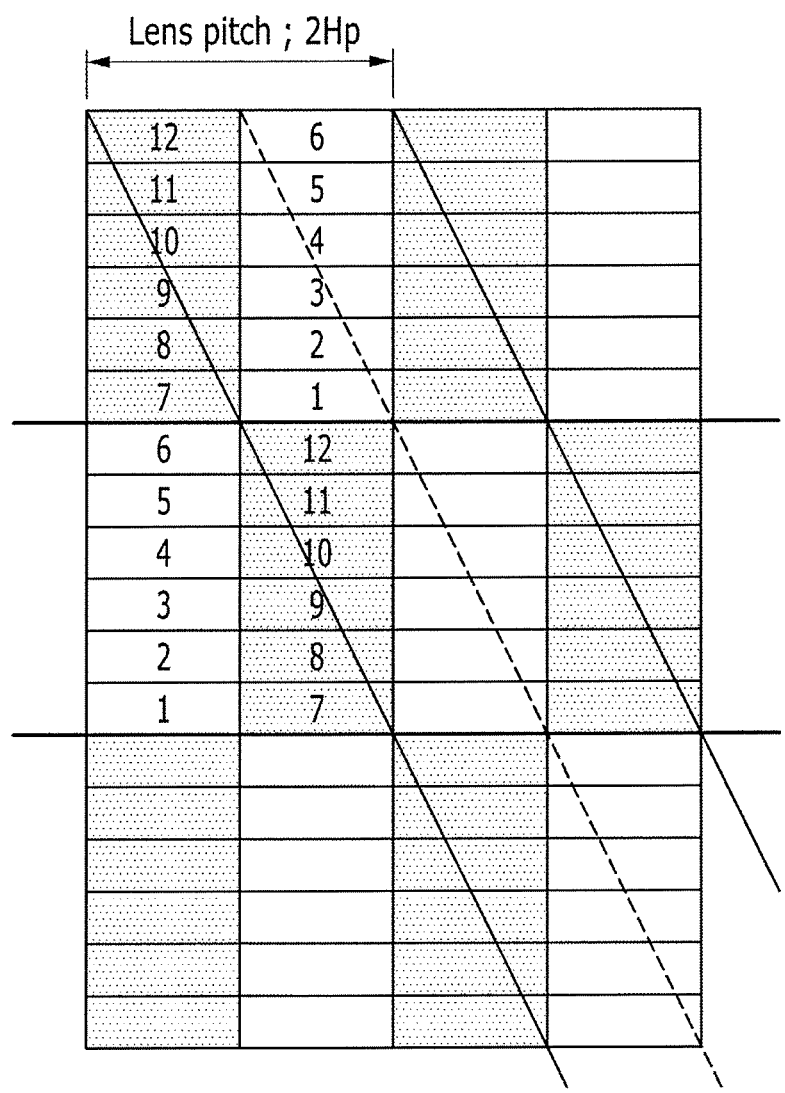
FIGS. 8A-B are diagrams that illustrate an exemplary embodiment of a view point division part that can decrease the optimal viewing distance in landscape mode.
Figure 8B:
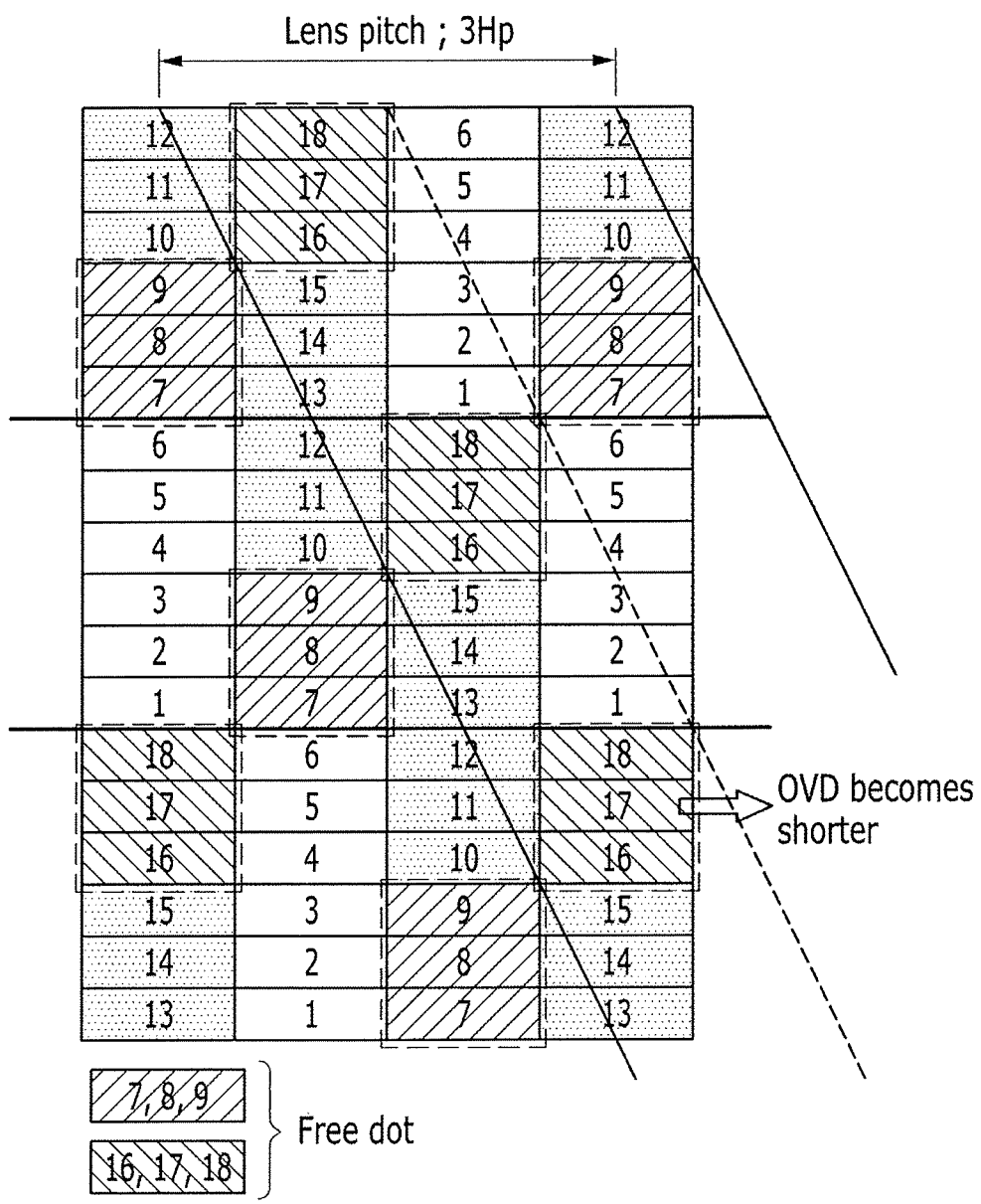

FIGS. 8A-B are diagrams that illustrate an exemplary embodiment of a view point division part that can decrease the optimal viewing distance in landscape mode.

In FIGS. 8A-B, in landscape mode, a horizontal pitch of the pixel is referred to as Hp.

In general, the OVD in landscape mode is less than the OVD in portrait mode.

This is because of the pitch of the pixels of the display panel 300. As the pitch of the pixels increases, an angle of light incident to the lens from the pixels increases.

In other words, as the lens pitch increases, the OVD decreases.

In an exemplary embodiment of FIG. 8A, an inclination angle is tan−1(Hp/(6*Vp)) and the lens pitch corresponds to 2 Hp. Crosstalk does not occur.

An exemplary embodiment of FIG. 8B illustrates a case where free pixels (free dots) are partially introduced in FIG. 8A.

The term "free pixels" refers to residual pixels which do not belong to either the right eye image or the left eye image. However, free pixels which border the viewing area of the right eye may be referred to as right eye free pixels, and similarly, free pixels which border the viewing area of the left eye may be referred to as left eye free pixels. The free pixels may be in an off state and have a predetermined data value.

In FIG. 8B, the free pixels are 7, 8, 9 and 16, 17, and 18.

In FIG. 8B, the lens pitch becomes 3 Hp by introducing free pixels. Accordingly, the OVD may become shorter.

However, as illustrated in FIG. 8B, since no solid line or dotted line traverses the pixels 7, 8, 9, 16, 17, and 18, the pixels are not viewed by the user's eyes to deteriorate the image quality.

Figure 9A:
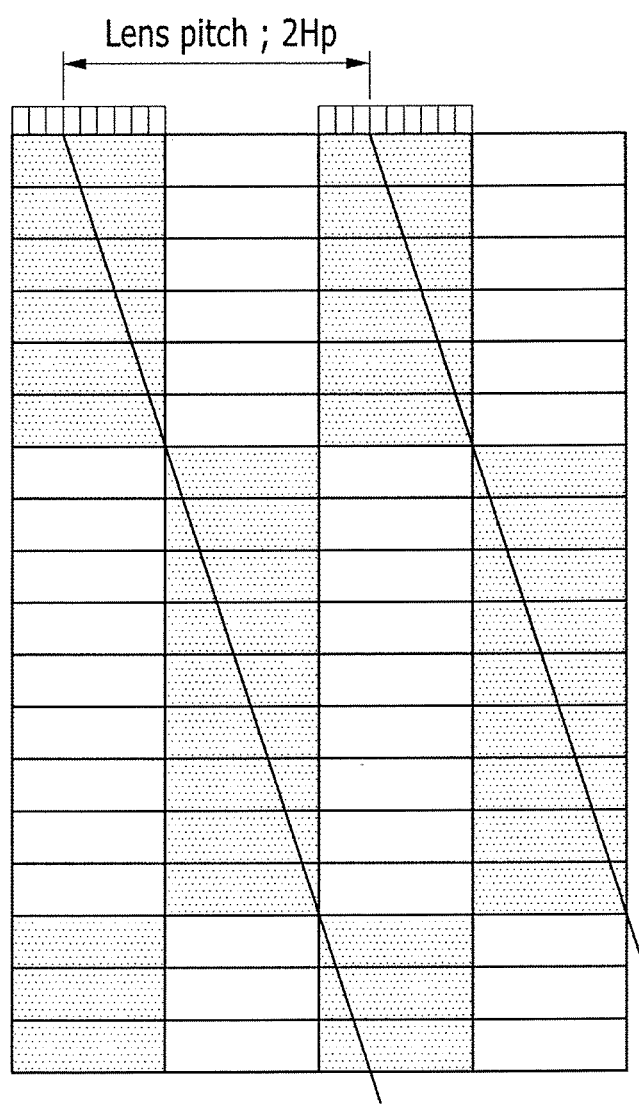
FIGS. 9A-B are diagrams that illustrate another exemplary embodiment of a view point division part that can increase the optimal viewing distance in landscape mode.
Figure 9B:
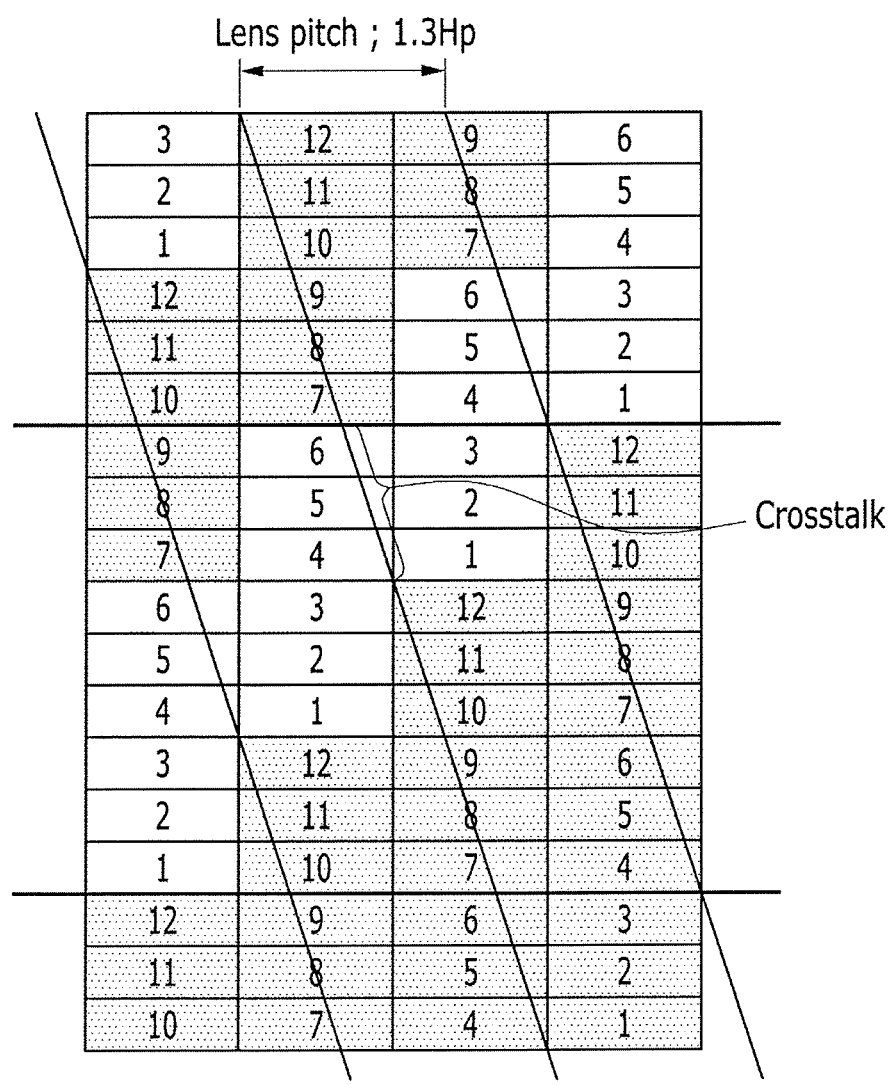

FIGS. 9A-B are diagrams that illustrate another exemplary embodiment of a view point division part that can increase the optimal viewing distance in landscape mode.

In FIGS. 9A-B, in landscape mode, a horizontal pitch of the pixel is referred to as Hp.

Referring to FIGS. 9A-B, an inclination angle is tan−1(Hp/(9*Vp)) and the lens pitch corresponds to 2 Hp.

If the OVD is to be increased, the view point division part should be opposite to the case of introducing free pixels of FIG. 8B.

Accordingly, in FIG. 9B, while the inclination angle of the lens is maintained, an embodiment that reduces the number of pixels displaying the right eye image and the left eye image is illustrated.

As a result, the lens pitch is decreased up to 1.3 Hp.

However, the pixels 4, 5, and 6 in which the left eye image data are displayed cross the area viewed by the right eye and thus crosstalk occurs.

Accordingly, there are many situations in which the OVD should be increased.

Therefore, when the OVDs of landscape mode and portrait mode should be the same, the shorter OVD of landscape mode may be set as a criteria and the OVD of portrait mode may be made to coincide with that criteria.

Figure 10A:
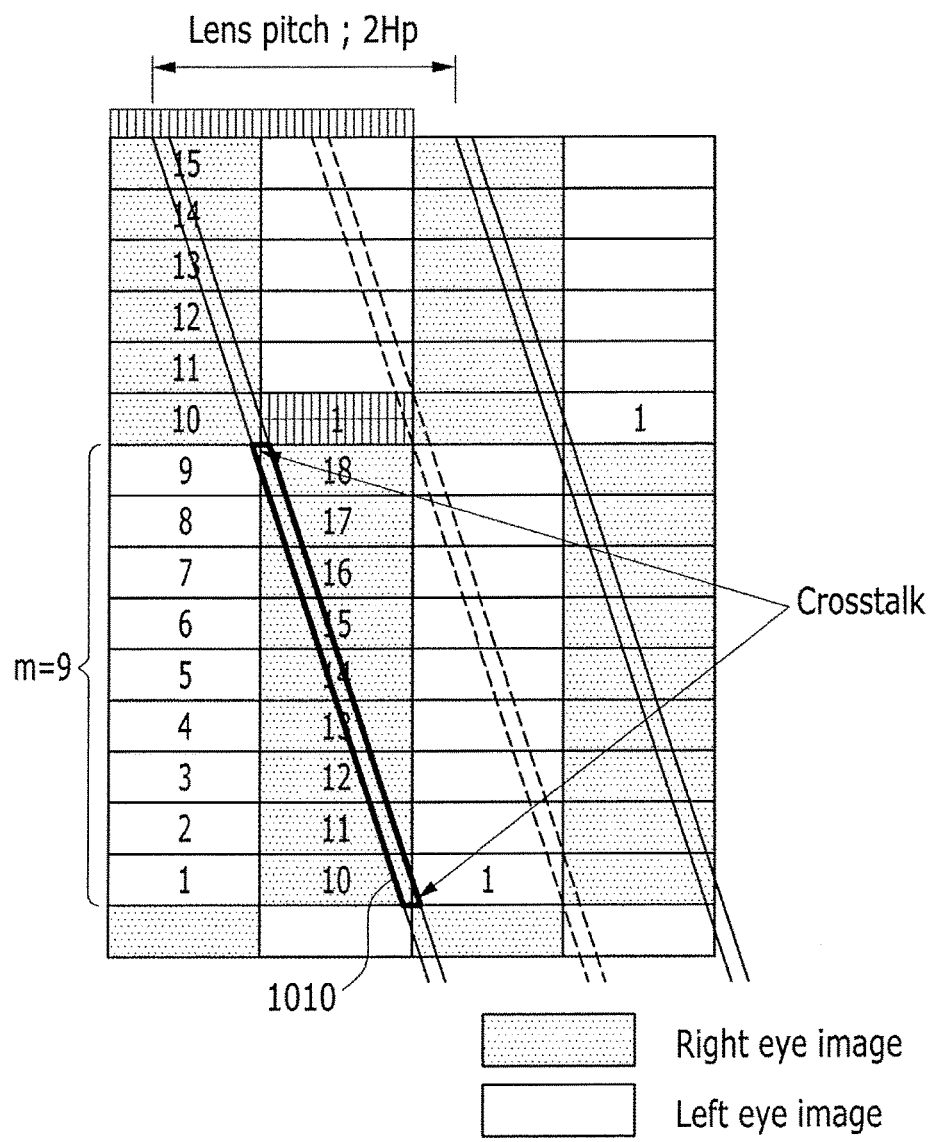
FIGS. 10A-B are diagrams that illustrate crosstalk in a view point division part in landscape mode.
Figure 10B:
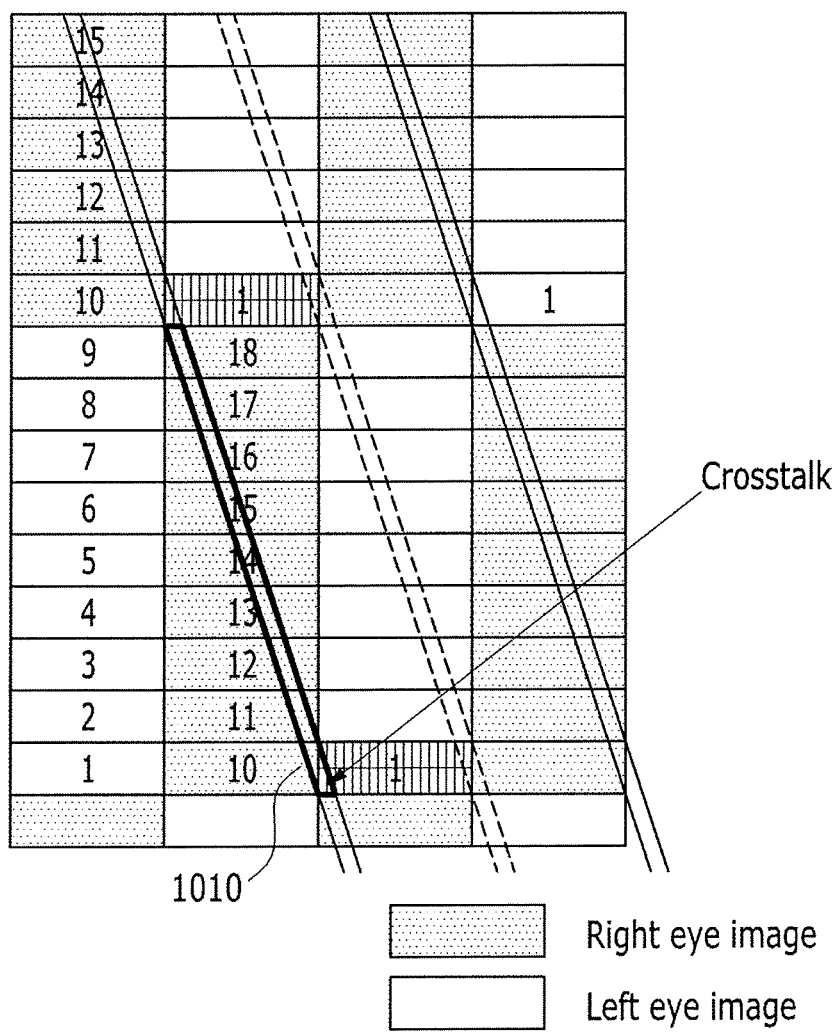

FIGS. 10A-B are diagrams that illustrate crosstalk in a view point division part in landscape mode.

In FIGS. 10A-B, in landscape mode, a horizontal pitch of the pixel is referred to as Hp.

The 3D image display devices of FIGS. 10A and 10B are substantially the same as each other, but viewing states vary according to the movement of the user.

The inclination angle is tan−1(Hp/(9*Vp)), and the number of proximity dots is b+m−1=1+9−1=9.

The lens pitch is 2*(1+9-1)*Hp/9=2 Hp according to the aforementioned Equation 3.

Further, the appropriate defocusing amount for removing the moire phenomenon is Hp/9.

FIG. 10A illustrates a viewing state when crosstalk is a minimum.

In FIG. 10A, the viewing area for the right eye surrounded by the bold diagonal line is a defocused area viewed by a user's eye.

When the pixels displaying the left eye image are included in the right eye viewing area, crosstalk occurs at the right eye viewing area.

A right eye viewing area 1010 overlapping one proximity dot area crosses the right eye pixels 10 to 18 and left eye pixels 1 and 9.

To calculate the crosstalk portion of the right eye viewing area 1010, one pixel is divided into 18 horizontal rooms and 2 vertical rooms. This is proportional to the case of m=9 and b=1.

The 36 divided rooms are used as a unit which calculates an area below.

The area of a parallelogram-shaped right eye viewing area 1010 is 2*18=36.

The crosstalk area overlapping the pixels 1 and 9 for the left eye is 1.

Accordingly, a crosstalk rate is 100*1/36=2.8%.

FIG. 10B illustrates a viewing state when crosstalk is a maximum.

Even in an exemplary embodiment of FIG. 10B, the area of the parallelogram-shaped right eye viewing area 1010 is 36.

In pixel 1, crosstalk occurs, and the area of the crosstalk region is 2*2/2=2.

Accordingly, a crosstalk rate is 100*2/36=5.6%.

When considering FIGS. 10A and 10B, it may be seen that even though the user's viewing point varies, a small amount of crosstalk occurs.

FIG. 11 is a diagram that illustrates an exemplary embodiment of an optimal viewing distance in the embodiment of FIGS. 10A-B.

An average human binocular distance may be calculated as 63 mm. However, the average human binocular distance may change because the reference may vary based on an age of a user. Accordingly, in an embodiment of the present disclosure, the average human binocular distance is referred to as E.

The OVD is referred to as d.

A distance between the view point division part 800 and the display panel 300 is referred to as g.

In this case, the g value may be defined so as to satisfy the following Equations 7, 8, 9 and 10. However, the g value is not limited to the definitions of Eqs. 7-10, and those skilled in the art can understand that other factors, that is, Hp, Vp, E, d, b, m, n, a, Lp, and L1 may be considered in defining g.

$$Hp: g = m * \frac{E}{(b+m-1)} : d \qquad \text{[Equation 7]}$$

$$d: Lp = (d+g) : 2*(b+m-1) * \frac{Hp}{m} \qquad \text{[Equation 8]}$$

$$Vp: g = a * \frac{E}{(n+a-1)} : d \qquad \text{[Equation 9]}$$

$$d: L1 = (d+g) : 2*(a+n-1) * \frac{Vp}{a} \qquad \text{[Equation 10]}$$

The aforementioned Equations 7 and 8 are conditions to be satisfied in portrait mode, and Equations 9 and 10 are conditions to be satisfied in landscape mode.

An exemplary embodiment of FIG. 11 is described based on portrait mode and not landscape mode, but those skilled in the art can understand that the same principle may be applied in landscape mode based on the contents of this specification.

In FIG. 11, it may be assumed that b=1 and m=9 for a 3D image display device.

As described above, proximity dots refers to the number of adjacent pixels that may be simultaneously viewed through the lens.

Nine proximity pixels 1 to 9 may be simultaneously viewed by the user's right eye in FIG. 11, and may be calculated by b+m−1=1+9−1=9.

Accordingly, each of nine pixels is viewed with a width of E/(b+m−1)=E/9 by the user's right eye. As described above with reference to defocusing, nine pixels are viewed with a width of E/9, which is the m value.

As described above, referring to FIG. 11, a proportional equation expressed by Equation 7 will be understood to those skilled in the art.

In portrait mode, the lens pitch on the display panel satisfies the following Equation $$\frac{2*(b+m-1)*Hp}{m}$$

as described in Equation 3. It should be noted that until now, the Lp value has referred to the value of the corresponding lens pitch on the display panel, but here, the Lp value refers to an actual lens pitch value. Accordingly, Equation 3 is not satisfied, but the following Equation 11 is satisfied.

$$Lp = k * \frac{2*(b+m-1)*Hp}{m} \qquad \text{[equation 11]}$$

where k is any constant number.

As described above, referring to FIG. 11, a proportional equation expressed by Equation 8 will be understood to those skilled in the art.

The OVD in an exemplary embodiment of FIG. 11 satisfies d=E*g/Hp.

Figure 12A:
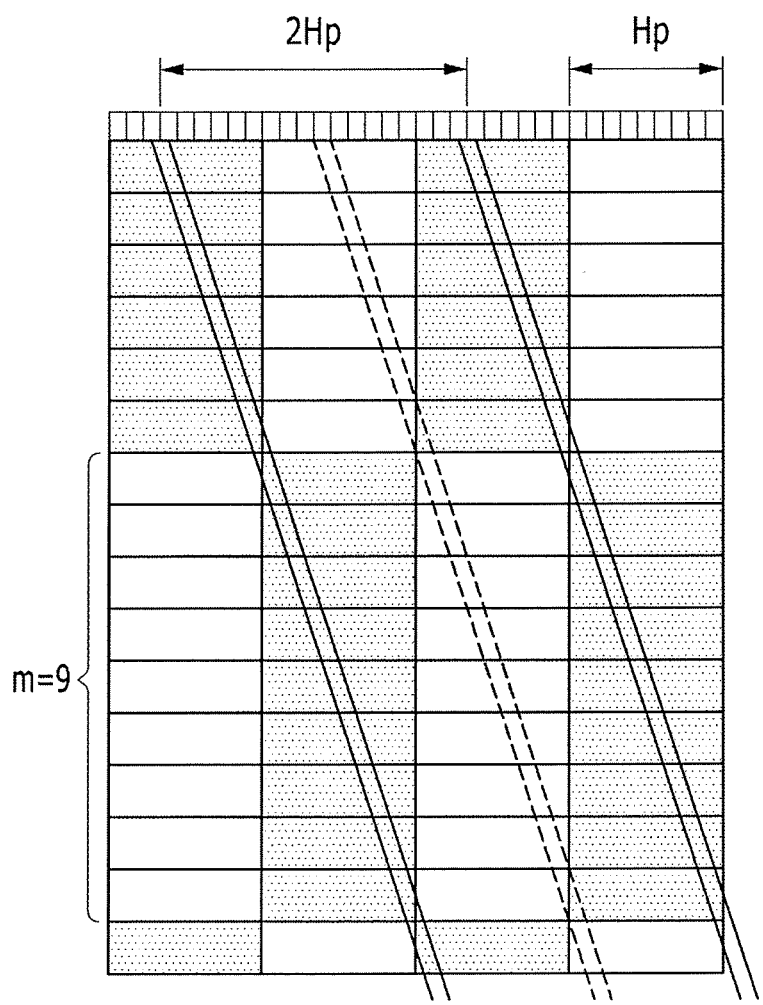
FIGS. 12A-B are diagrams that illustrate an exemplary embodiment of a view point division part when free pixels are used on a display panel.
Figure 12B:
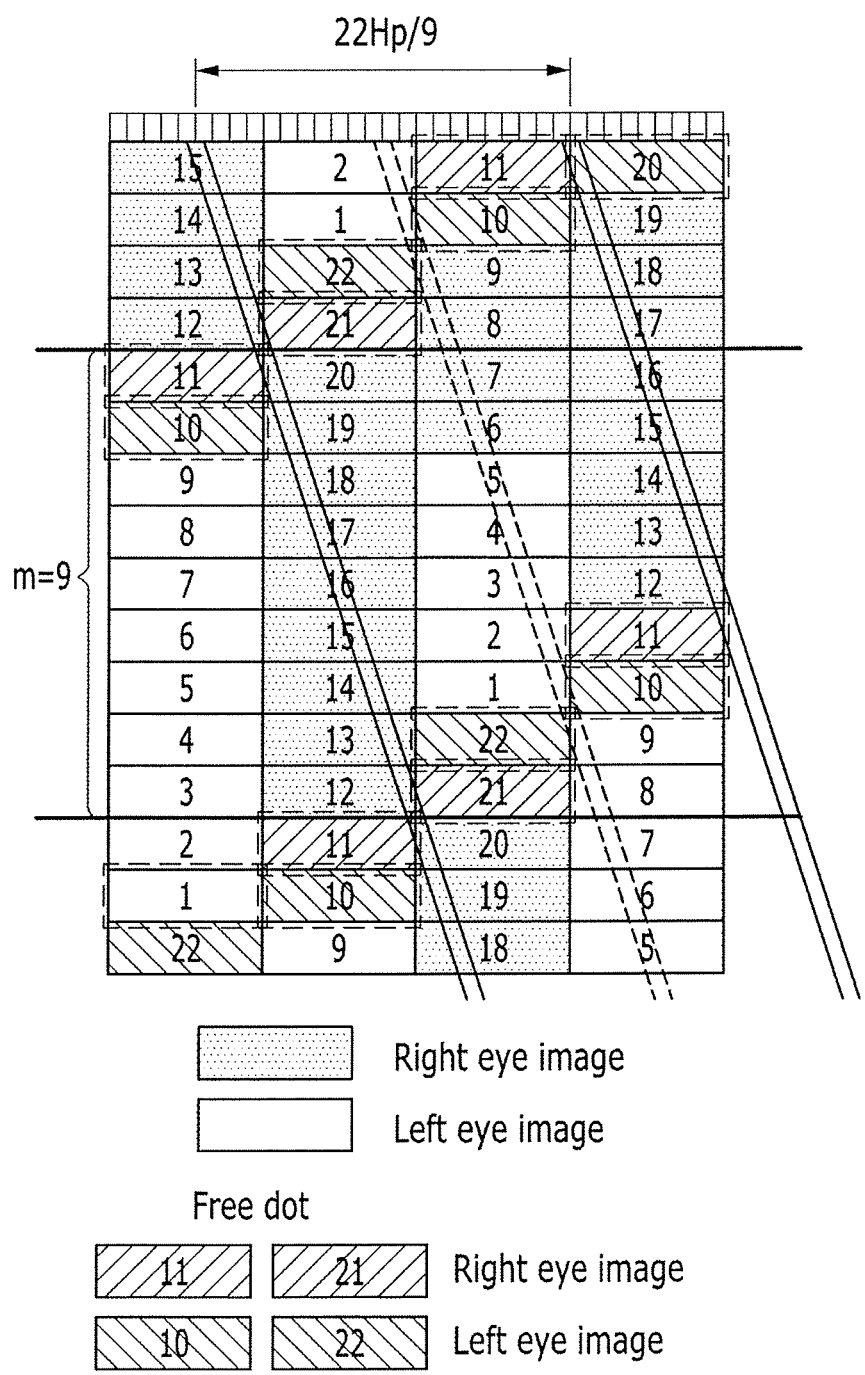

FIGS. 12A-B are diagrams that illustrate an exemplary embodiment of a view point division part when free pixels are used on a display panel.

FIG. 12A illustrates an embodiment in which there is no free pixel in landscape mode.

FIG. 12B illustrates an embodiment in which free pixels are introduced into the embodiment of FIG. 12A.

The right eye free pixels are pixels 11 and 21, and the left eye free pixels are pixels 10 and 22.

As a result, the lens pitch is enlarged from 2 Hp to 22 Hp/9, and the OVD is reduced by a factor of 0.81.

Further, crosstalk may be maintained in a state of 0 by inserting free pixels.

Figure 13A:
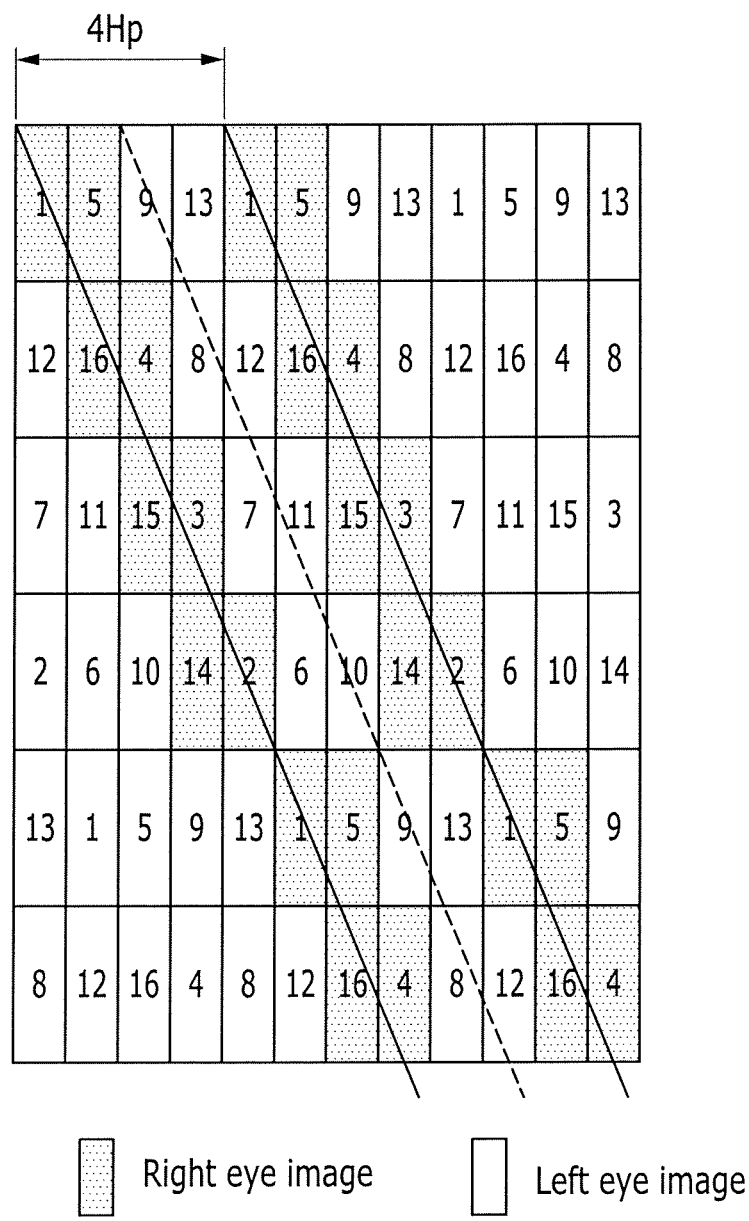
FIGS. 13A-B are diagrams that illustrate a change in lens pitch according to an inclination angle of the view point division unit.
Figure 13B:
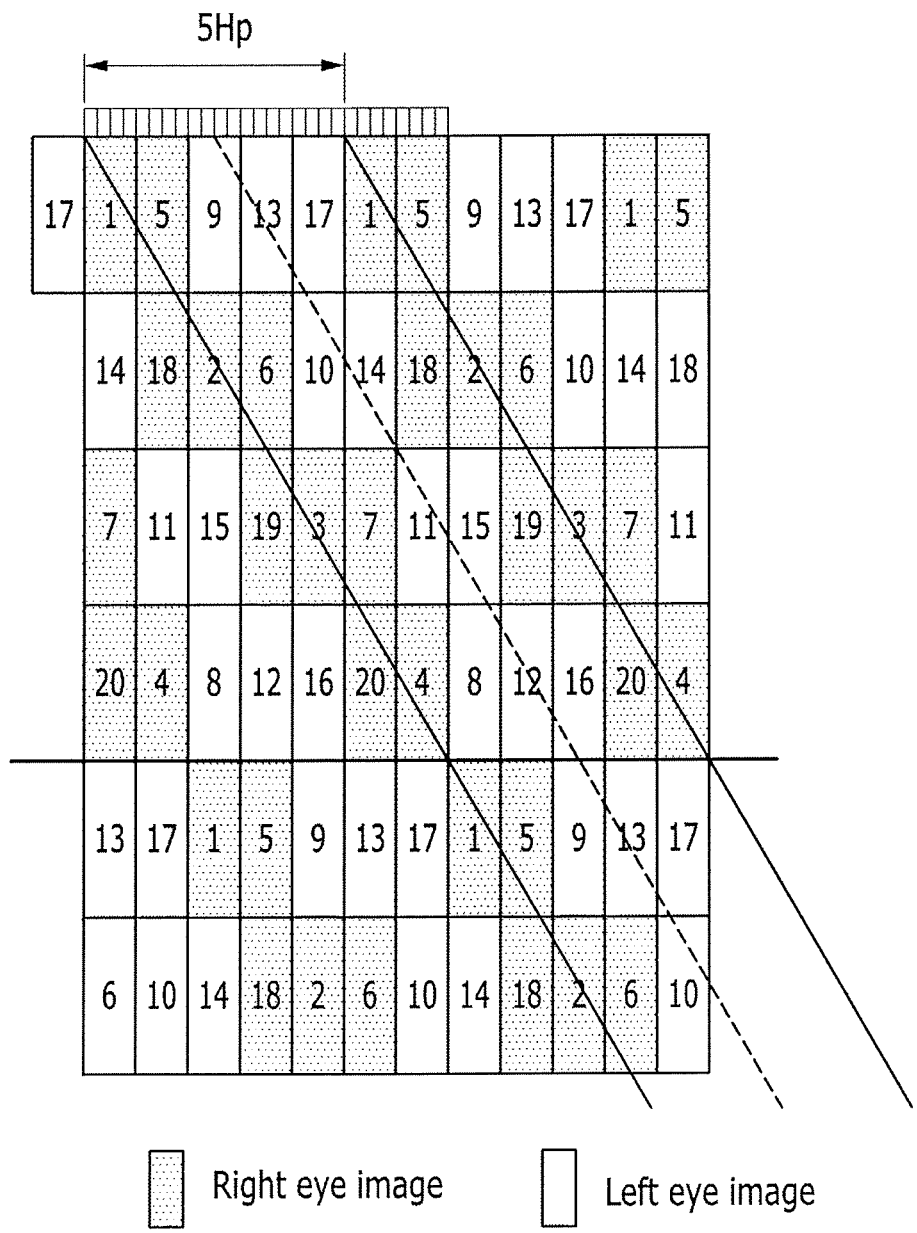

FIGS. 13A-B are diagrams that illustrate a change in a lens pitch according to an inclination angle of the view point division unit.

In an exemplary embodiment of FIGS. 13A-B, an embodiment in portrait mode will be described.

As described above, in portrait mode and landscape mode, since the horizontal pitches of the pixels differ from each other, the OVD in portrait mode is greater than the OVD in landscape mode.

Accordingly, an exemplary embodiment of FIG. 13 can reduce the OVD in portrait mode to achieve the same OVD in landscape mode.

The OVD can be shortened by introducing free pixels, but since image quality may deteriorate, the free pixels may be as small as possible.

In FIG. 13A and FIG. 13B, the inclination angles differ from each other.

The inclination angle in FIG. 13A is tan−1((5*Hp)/(4*Vp)), and the inclination angle in FIG. 13B is tan−1((7*Hp)/(4*Vp)).

When the lens pitch is calculated using the aforementioned Equation 3, the corresponding lens pitch on the display panel in FIG. 13A is 2*(5+4−1)*Hp/4=4 Hp.

Further, in FIG. 13B, the corresponding lens pitch on the display panel is 2*(4+7−1)*Hp/4=5 Hp.

As a result, the lens pitch may be changed based on the inclination angle of the view point division unit 810 even without introducing free pixels.

Figure 14A:
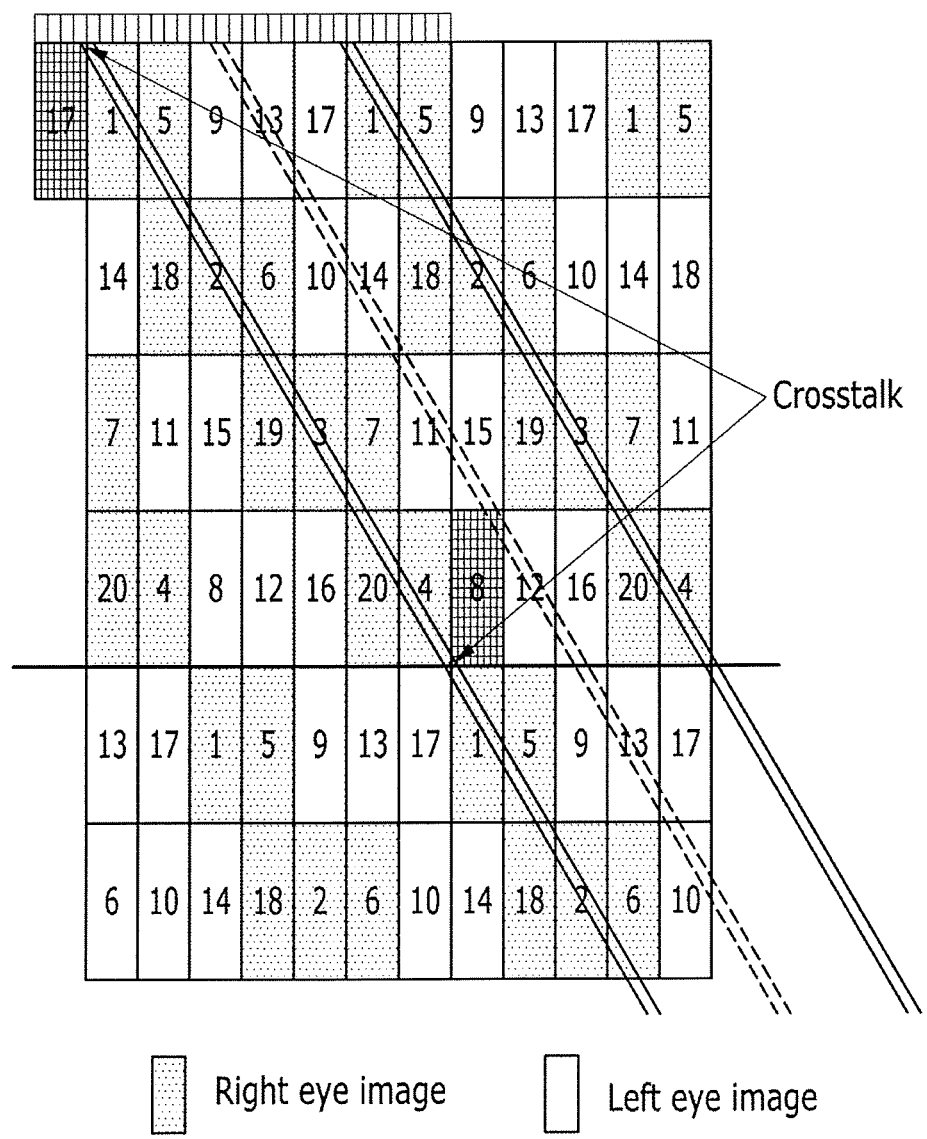
FIGS. 14A-B are diagrams that illustrate crosstalk in an exemplary embodiment of FIG. 13B.
Figure 14B:
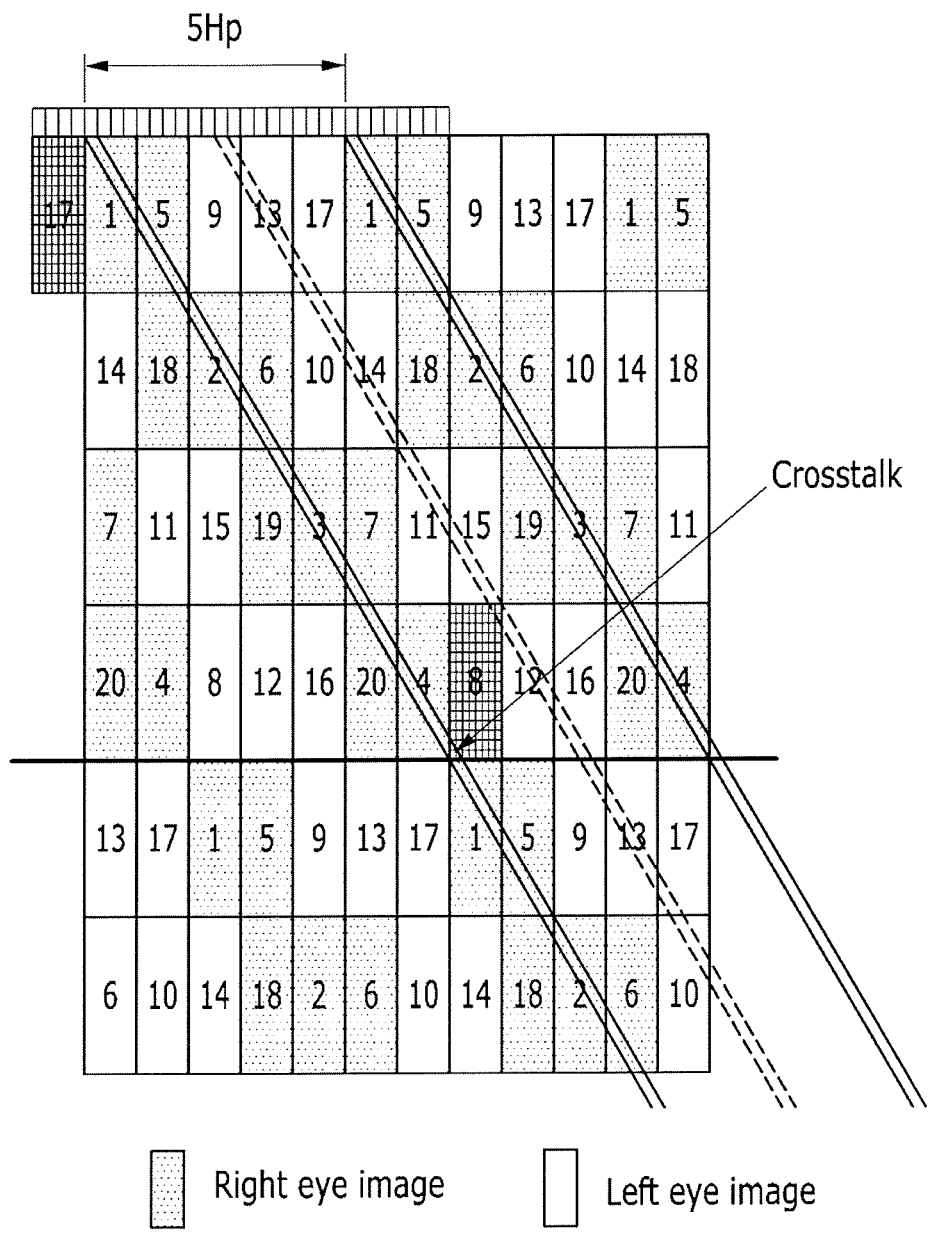

FIGS. 14A-B are diagrams that illustrate crosstalk in an exemplary embodiment of FIG. 13B.

The calculation method is the same as that of an exemplary embodiment of FIG. 10, and hereinafter, only the result is compared.

FIG. 14A illustrates a viewing state when crosstalk is a minimum.

In FIG. 14A, a crosstalk rate is 0.9%.

FIG. 14B illustrates a viewing state when crosstalk is a maximum.

In FIG. 14B, a crosstalk rate is 1.8%.

Accordingly, as compared with an exemplary embodiment of FIG. 10, a lower crosstalk rate is shown.

Figure 15B:
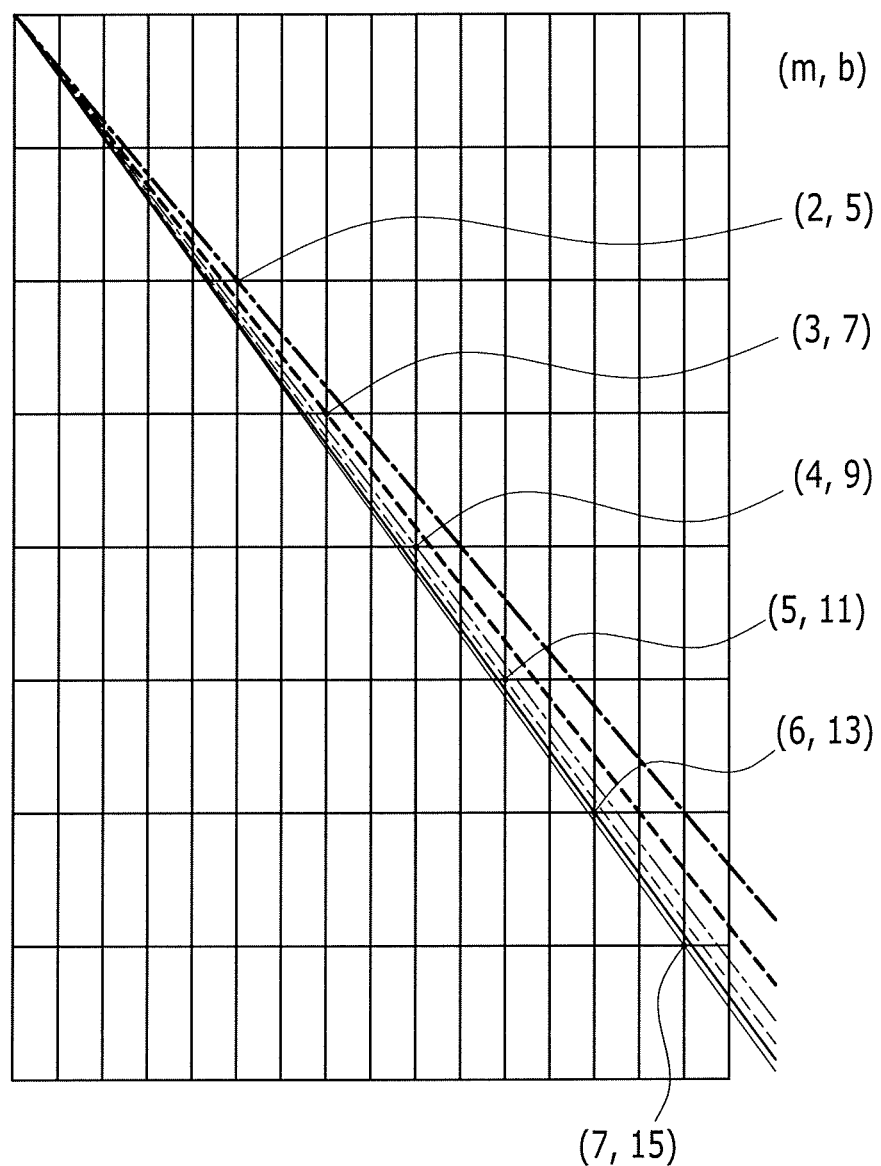

FIGS. 15A-B are diagrams that illustrate a combination of values of m and b in portrait mode which may have the same lens pitch as in landscape mode.

As described above, the OVD is inversely proportional to the lens pitch. When the lens pitch increases, the OVD decreases, and when the lens pitch decreases, the OVD increases.

The lens pitch of an embodiment in landscape mode of FIG. 10 corresponds to 6 Hp when considering Equation 1.

In FIGS. 15A-B, the lens pitch in portrait mode is adjusted to 6 Hp to implement a same OVD in both portrait mode and landscape mode.

Accordingly, in the table of FIG. 15A, combinations of m and b values which adjust the lens pitch Lp to 6 Hp are illustrated. The table of FIG. 15A also shows corresponding values for the number of proximity dots (PD), the value of 2 n, the control unit for head tracking (HT), and the appropriate defocusing amount.

FIG. 15B illustrates the inclination angles according to the values of m and b.

When determining values of m and b, the following may be considered.

When considering the lens inclination angle, m may have a large value, but there is no large differences, as illustrated in FIG. 15B.

A size of the control unit for head tracking (HT) should be large, and thus m should be small.

The appropriate defocusing amount should be small to prevent the moire phenomenon, which suggests a larger value for m.

When considering the above, m may be 4 or 5.

Accordingly, an exemplary embodiment of an image display device having m=4 and b=9 is illustrated in FIGS. 6A-B.

Figure 16A:
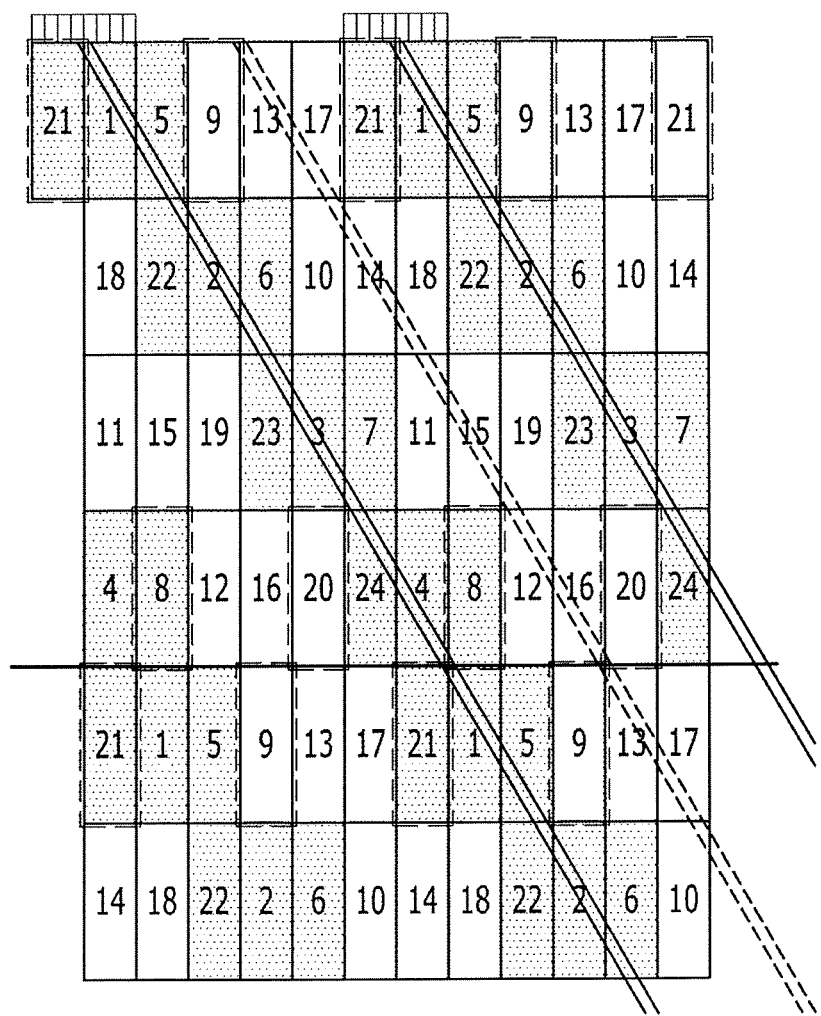
FIGS. 16A-B are diagrams that illustrate an exemplary embodiment of a view point division part when free pixels are used in portrait mode.
Figure 16B:
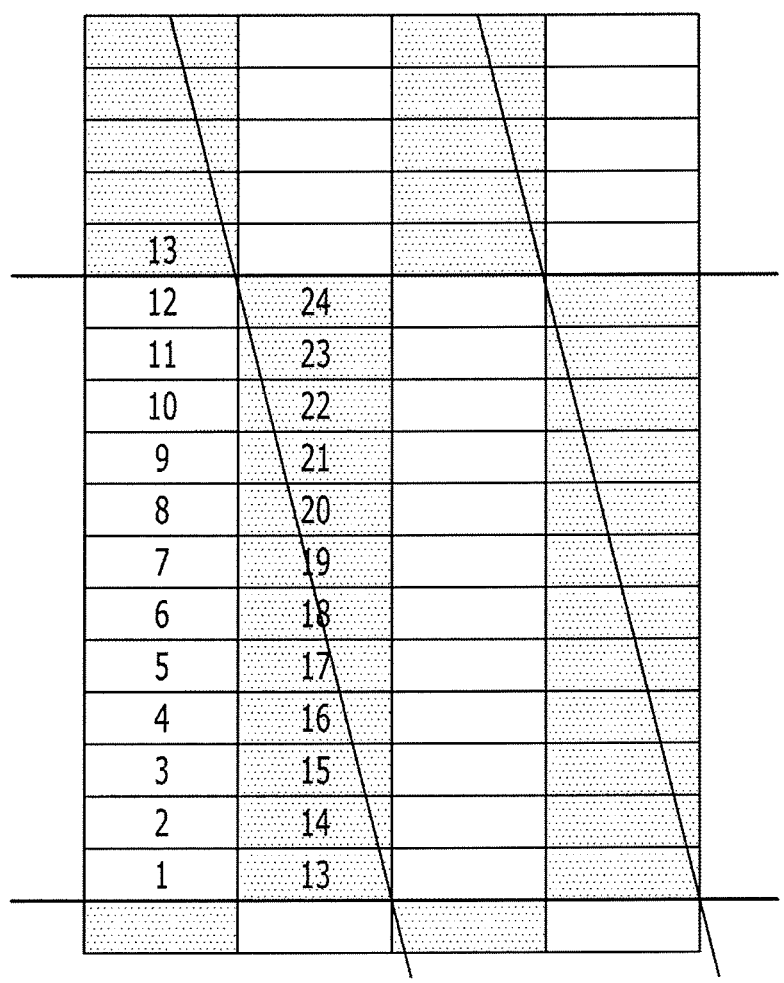

FIGS. 16A-B are diagrams that illustrate an exemplary embodiment of a view point division part when free pixels are applied in portrait mode.

When an exemplary embodiment of FIGS. 16A-B is compared with an exemplary embodiment of FIGS. 6A-B, landscape mode is the same and an exemplary embodiment of FIGS. 16A-B illustrates a case of introducing free pixels in portrait mode.

Referring to FIG. 16A, the right eye free pixels are pixels 8 and 21, and the left eye free pixels are pixels 9 and 20.

As compared with an exemplary embodiment of FIG. 6A, in FIG. 16A, the inclination angle of the lens in portrait mode may be smaller.

When the inclination angle of the lens is smaller, a change in view point when a user's head moves in a vertical direction infrequently occurs.

In FIGS. 16A and 16B, the numbers of proximity dots are the same, as 4+7−1+2=12 and 1+12−1=12, respectively. In this case, when the number of free pixels is c, the number of proximity dots may be expressed by b+m−1+c=a+n−1.

The lens pitches are the same as 6 Hp, and the defocus amounts are the same as Hp/4.

Since the lens pitches are the same, the OVDs in portrait mode and landscape mode may also be equally calculated.

In the case of introducing free pixels c only in landscape mode, which is not the case of FIG. 16A, the number of proximity dots in both modes may be expressed by the following Equation 12.

$$a+n-1+c=b+m-1 \qquad \text{[Equation 12]}$$

In this case, a+n−1+c may be replaced with a+n−1, which is a factor of the proximity dots of Equations 6, 9 and 10.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A 3D image display device, comprising:
 a display panel that includes a plurality of pixels arranged in a matrix form; and
 a view point division part that divides the plurality of pixels into a plurality of corresponding view points,
 wherein the view point division part includes:
 a plurality of view point division units, each associated with a lenticular lens tilted at an inclination angle; and
 an inclination angle changing unit configured to change the inclination angles of the plurality of the view point division units to correspond to a portrait mode or a landscape mode, and
 the view point division part and the display panel are configured so that a same optimal viewing distance (OVD) is calculated in portrait mode and landscape mode.

2. The 3D image display device of claim 1, wherein:
 the inclination angle changing unit includes:
 an upper substrate;
 a lower substrate;
 a plurality of first electrodes disposed on the upper substrate to correspond to the inclination angle of one mode of portrait mode or landscape mode;
 a plurality of second electrodes disposed on the lower substrate to correspond to the inclination angle of a mode other than the one mode, and
 a liquid crystal layer interposed between the upper substrate and the lower substrate,
 wherein the liquid crystal layer changes into the lenticular lenses according to a voltage applied to at least one of the plurality of first electrodes and second electrodes.

3. The 3D image display device of claim 1, wherein:
 the inclination angle in portrait mode is defined according to a value obtained by multiplying a first coefficient by a first ratio between a horizontal pitch of a pixel and a vertical pitch of the pixel,
 the inclination angle in landscape mode is defined according to a value obtained by multiplying a second coefficient by a reciprocal of the first ratio, and
 a second ratio between a horizontal lens pitch of the lenticular lens and a vertical lens pitch of the lenticular lens is the first ratio multiplied by a ratio between a function of two variables used to determine the first coefficient and a function of two variables used to determine the second coefficient.

4. The 3D image display device of claim 3, wherein:
Hp is the horizontal pitch of the pixel, Vp is the vertical pitch of the pixel, Hp<Vp, b, m, n, and a are natural numbers,
A1 is the inclination angle in portrait mode, and A2 is the inclination angle in landscape mode,
A1 and A2 are defined by the following Equations, $$A1 = \tan^{-1} \frac{b*Hp}{m*Vp},$$

$$A2 = \tan^{-1} \frac{n*Vp}{a*Hp},$$

Lp is the horizontal lens pitch of the lenticular lens, and L1 is the vertical lens pitch of the lenticular lens,
Lp and L1 satisfy the second ratio of the following Equation, $$Lp:Ll = \frac{2*(b+m-1)*Hp}{m} : \frac{2*(a+n-1)*Vp}{a},$$

wherein values of b, m, n, and a are determined to satisfy Lp=L1 and the inclination angles of the plurality of view point division units in portrait mode and landscape mode are determined.

5. The 3D image display device of claim 4, wherein:
E is an average human binocular distance, d is the OVD, and g is a distance between the view point division part and the display panel,
the g value is determined to satisfy the following Equations, $$Hp:g = m * \frac{E}{(b+m-1)} : d,$$

$$d:Lp = (d+g):2*(b+m-1)*\frac{Hp}{m},$$

$$Vp:g = a * \frac{E}{(n+a-1)} : d,$$

$$d:Ll = (d+g):2*(a+n-1)*\frac{Vp}{a}.$$

6. The 3D image display device of claim 4, wherein:
b, m, n, and a satisfy the following Equation, $$a+n=b+m$$

7. The 3D image display device of claim 4, wherein:
m and a satisfy the following Equation, $$\frac{Hp}{m} = \frac{Vp}{a}.$$

8. The 3D image display device of claim 1, wherein:
at least one pixel in one of landscape mode or portrait mode is used as a free pixel,
the inclination angle in portrait mode is defined according to a value obtained by multiplying a first coefficient by a first ratio between a horizontal pitch of the pixel and a vertical pitch of the pixel,
the inclination angle in landscape mode is defined according to a value obtained by multiplying a second coefficient by a reciprocal of the first ratio, and
a second ratio between a horizontal lens pitch of the lenticular lens and a vertical lens pitch of the lenticular lens is the first ratio multiplied by a ratio between a function of two variables used to determine the first coefficient and a function of two variables used to determine the second coefficient and a number of free pixels.

9. The 3D image display device of claim 8, wherein:
Hp is the horizontal pitch of the pixel, Vp is the vertical pitch of the pixel, Hp<Vp, b, m, n, and a are natural numbers,
A1 is the inclination angle in portrait mode and A2 is the inclination angle in landscape mode, A1 and A2 are defined by the following Equations, $$A1 = \tan^{-1} \frac{b*Hp}{m*Vp},$$

$$A2 = \tan^{-1} \frac{n*Vp}{a*Hp},$$

c is the number of free pixels is c, Lp is the horizontal lens pitch of the lenticular lens, and L1 is the vertical lens pitch of the lenticular lens,
Lp and L1 satisfy the second ratio of the following Equation, $$Lp:Ll = \frac{2*(b+m-1)*Hp}{m} : \frac{2*(a+n-1+c)*Vp}{a},$$

wherein, values of b, m, n, and a are determined to satisfy Lp=L1 and the inclination angles of the plurality of view point division units in portrait mode and landscape mode are determined.

10. The 3D image display device of claim 9, wherein:
E is an average human binocular distance, d is the OVD, and g is a distance between the view point division part and the display panel,
the g value is determined to satisfy the following Equations, $$Hp:g = m * \frac{E}{(b+m-1)} : d,$$

$$d:Lp = (d+g):2*(b+m-1)*\frac{Hp}{m},$$

$$Vp:g = a * \frac{E}{(n+a-1+c)} : d,$$

$$d:Ll = (d+g):2*(a+n-1+c)*\frac{Vp}{a}.$$

11. The 3D image display device of claim 9, wherein:
b, m, n, and a satisfy the following Equation, $$a+n+c=b+m.$$

12. The 3D image display device of claim 9, wherein:
m and a satisfy the following Equation, $$\frac{Hp}{m} = \frac{Vp}{a}.$$

13. A 3D image display device, comprising:
a view point division part that divides a plurality of pixels into a plurality of corresponding view points, wherein the view point division part includes:
a plurality of view point division units having a lenticular lens shape tilted according to an inclination angle; and
an inclination angle changing unit configured to change the inclination angles of the plurality of the view point division units to correspond to a portrait mode or a landscape mode, wherein
the inclination angle in portrait mode is defined according to a value obtained by multiplying a first coefficient by a first ratio between a horizontal pitch of a pixel and a vertical pitch of the pixel,
the inclination angle in landscape mode is defined according to a value obtained by multiplying a second coefficient by a reciprocal of the first ratio,
a second ratio between a horizontal lens pitch of the lenticular lens and a vertical lens pitch of the lenticular lens is the first ratio multiplied by a ratio between a function of two variables used to determine the first coefficient and a function of two variables used to determine the second coefficient, and
an optimal viewing distance is the same in portrait mode and landscape mode.

14. The 3D image display device of claim 13, wherein:
Hp is the horizontal pitch of the pixel, Vp is the vertical pitch of the pixel, Hp<Vp, and b, m, n, and a are natural numbers,
A1 is the inclination angle in portrait mode, and A2 is the inclination angle in landscape mode,
A1 and A2 are defined by the following Equation, $$A1 = \tan^{-1}\frac{b*Hp}{m*Vp},$$

$$A2 = \tan^{-1}\frac{n*Vp}{a*Hp},$$

Lp is the horizontal lens pitch of the lenticular lens, and L1 is the vertical lens pitch of the lenticular lens,
Lp and L1 satisfy the second ratio of the following Equation, $$Lp:L1 = \frac{2*(b+m-1)*Hp}{m} : \frac{2*(a+n-1)*Vp}{a},$$

wherein values of b, m, n, and a are determined to satisfy Lp=L1 and the inclination angles of the plurality of view point division units in portrait mode and landscape mode are determined.

15. The 3D image display device of claim 14, wherein:
E is an average human binocular distance, d is the OVD, and g is a distance between the view point division part and the display panel,
the g value is determined so as to satisfy the following Equations, $$Hp:g = m*\frac{E}{(b+m-1)}:d,$$

$$d:Lp = (d+g):2*(b+m-1)*\frac{Hp}{m},$$

$$Vp:g = a*\frac{E}{(n+a-1)}:d,$$

$$d:L1 = (d+g):2*(a+n-1)*\frac{Vp}{a},$$

b, m, n, and a satisfy $$a+n=b+m,$$

and
m and a satisfy $$\frac{Hp}{m} = \frac{Vp}{a}.$$

16. The 3D image display device of claim 13, further comprising a display panel that includes the plurality of pixels arranged in a matrix form, wherein the inclination angle changing unit includes:
an upper substrate;
a lower substrate;
a plurality of first electrodes disposed on the upper substrate to correspond to the inclination angle of one mode of portrait mode or landscape mode;
a plurality of second electrodes disposed on the lower substrate to correspond to the inclination angle of a mode other than the one mode, and
a liquid crystal layer interposed between the upper substrate and the lower substrate,
wherein the liquid crystal layer changes into the lenticular lenses according to a voltage applied to at least one of the plurality of first electrodes and second electrodes.

17. A 3D image display device, comprising:
a view point division part that divides a plurality of pixels into a plurality of corresponding view points, wherein the view point division part includes:
a plurality of view point division units having a lenticular lens shape tilted according to an inclination angle; and
an inclination angle changing unit configured to change the inclination angles of the plurality of the view point division units to correspond to a portrait mode or a landscape mode, wherein
at least one pixel in one of landscape mode or portrait mode is used as a free pixel,
the inclination angle in portrait mode is defined according to a value obtained by multiplying a first coefficient by a first ratio between a horizontal pitch of a pixel and a vertical pitch of the pixel,
the inclination angle in landscape mode is defined according to a value obtained by multiplying a second coefficient by a reciprocal of the first ratio,
a second ratio between a horizontal lens pitch of the lenticular lens and a vertical lens pitch of the lenticular lens is the first ratio multiplied by a ratio between a function of two variables used to determine the first coefficient and a function of two variables used to determine the second coefficient and a number of free pixels, and
an optimal viewing distance is the same in portrait mode and landscape mode.

18. The 3D image display device of claim 17, wherein:
Hp is the horizontal pitch of the pixel, Vp is the vertical pitch of the pixel, Hp<Vp, and b, m, n, and a are natural numbers, A1 is the inclination angle in portrait mode and A2 is the inclination angle in landscape mode,
A1 and A2 are defined by the following Equation, $$A1 = \tan^{-1}\frac{b*Hp}{m*Vp},$$

$$A2 = \tan^{-1}\frac{n*Vp}{a*Hp},$$

c is the number of free pixels is c, Lp is the horizontal lens pitch of the lenticular lens, and Ll is the vertical lens pitch of the lenticular lens,
Lp and Ll satisfy the second ratio of the following Equation, $$Lp:Ll = \frac{2*(b+m-1)*Hp}{m} : \frac{2*(a+n-1+c)*Vp}{a},$$

wherein, values of b, m, n, and a are determined to satisfy Lp=Ll and the inclination angles of the plurality of view point division units in portrait mode and landscape mode are determined.

19. The 3D image display device of claim 18, wherein:
E is an average human binocular distance, d is the OVD, and g is a distance between the view point division part and the display panel,
the g value is determined so as to satisfy the following Equations, $$Hp:g = m*\frac{E}{(b+m-1)}:d,$$

$$d:Lp = (d+g):2*(b+m-1)*\frac{Hp}{m},$$

$$Vp:g = a*\frac{E}{(n+a-1+c)}:d,$$

$$d:Ll = (d+g):2*(a+n-1+c)*\frac{Vp}{a},$$

b, m, n, and a satisfy $$a+n+c=b+m,$$

and
m and a satisfy $$\frac{Hp}{m} = \frac{Vp}{a}.$$

20. The 3D image display device of claim 17, further comprising a display panel that includes the plurality of pixels arranged in a matrix form, wherein the inclination angle changing unit includes:
an upper substrate;
a lower substrate;
a plurality of first electrodes disposed on the upper substrate to correspond to the inclination angle of one mode of portrait mode or landscape mode;
a plurality of second electrodes disposed on the lower substrate to correspond to the inclination angle of a mode other than the one mode, and
a liquid crystal layer interposed between the upper substrate and the lower substrate,
wherein the liquid crystal layer changes into the lenticular lenses according to a voltage applied to at least one of the plurality of first electrodes and second electrodes.

* * * * *